United States Patent
Honjo et al.

(10) Patent No.: US 7,639,637 B2
(45) Date of Patent: Dec. 29, 2009

(54) WIRELESS APPARATUS AND METHOD OF SELECTING WIRELESS ACCESS POINT

(75) Inventors: Masanori Honjo, Fukuoka (JP); Yuji Oie, Fukuoka (JP); Yutaka Fukuda, Fukuoka (JP)

(73) Assignee: Panasonic Corporation, Osaka (JP)

( * ) Notice: Subject to any disclaimer, the term of this patent is extended or adjusted under 35 U.S.C. 154(b) by 448 days.

(21) Appl. No.: 11/545,757

(22) Filed: Oct. 11, 2006

(65) Prior Publication Data

US 2007/0091864 A1   Apr. 26, 2007

(30) Foreign Application Priority Data

Oct. 13, 2005   (JP)   ............ P.2005-298535

(51) Int. Cl.
*H04B 7/00* (2006.01)
*H04W 4/00* (2009.01)

(52) U.S. Cl. .............. 370/310.2; 370/328; 455/434; 455/435.1

(58) Field of Classification Search .......... 370/310.2, 370/328–341; 455/450–453, 434, 226.1–4, 455/435.1–3, 436–445
See application file for complete search history.

(56) References Cited

U.S. PATENT DOCUMENTS

| | | | |
|---|---|---|---|
| 6,332,077 B1 * | 12/2001 | Wu et al. ............ | 455/432.1 |
| 6,522,881 B1 * | 2/2003 | Feder et al. ........... | 455/437 |
| 6,628,639 B1 | 9/2003 | Ishii | |
| 6,782,261 B1 * | 8/2004 | Ahmed et al. .......... | 455/437 |
| 2001/0019956 A1 * | 9/2001 | Tada ............ | 455/434 |
| 2003/0108010 A1 * | 6/2003 | Kim et al. ............ | 370/333 |
| 2005/0013278 A1 * | 1/2005 | Kim .................. | 370/341 |
| 2005/0032535 A1 | 2/2005 | Shitama et al. | |

FOREIGN PATENT DOCUMENTS

JP   2000232464   8/2000

(Continued)

OTHER PUBLICATIONS

Y. Fukuda, et al.; "Decentralized Access Point Selection Architecture for Wireless LANs," Wireless Telecommunications Symposium 2004, SA3, Pomona, CA, USA, May 14-15, 2004, 9 pages.

T. Abe, et al.; "Proposal and Evaluation of an Access Point Selection Strategy in Wireless LAN," The Institute of Electronics, Information and Communication Engineers, Technical Report of IEICE, Mar. 2003, pp. 1-6.

*Primary Examiner*—George Eng
*Assistant Examiner*—Chayce Bibbee
(74) *Attorney, Agent, or Firm*—Dickinson Wright PLLC

(57) ABSTRACT

PER when a wireless apparatus is connected with a predetermined wireless access point is estimated on the basis of three parameters of the received signal strength, the interference signal strength, and the interference adjacency, which have been transmitted from the wireless access point, then the communication throughput is calculated by using the estimated PER, and the connection with a wireless access point expected to have highest communication efficiency is performed. As a result, it is possible to select a wireless access point having high communication efficiency with good precision, as compared with a method, in the related art, of simply performing a connection with a wireless access point having high received signal strength or a method of simply performing a connection with a wireless access point where an interference wave is strong.

11 Claims, 17 Drawing Sheets

FOREIGN PATENT DOCUMENTS

| | | |
|---|---|---|
| JP | 2000299705 | 10/2000 |
| JP | 2002186019 | 6/2002 |
| JP | 2005039571 | 2/2005 |

* cited by examiner

FIG. 8

INFORMATION ELEMENT OF IEEE 802.11

| INFORMATION ELEMENT | ELEMENT ID |
|---|---|
| SSID (ESSID) | 0 |
| SUPPORTED RATES | 1 |
| FH PARAMETER SET OR THE LIKE | 2 – 31 |
| RESERVED | 32 – 255 |

FIG. 15

EXAMPLE OF A VARIETY OF INFORMATION STORED IN WIRELESS ACCESS POINT LIST MEMORY

| CHANNEL | CH1 | CH2 | CH3 | CH4 | CH5 | CH6 | CH7 | CH8 | CH9 | CH10 | CH11 | CH12 | CH13 |
|---|---|---|---|---|---|---|---|---|---|---|---|---|---|
| SELECTED-CANDIDATE ACCESS POINT | AP1 MAC ADDRESS | — | — | — | — | AP2 MAC ADDRESS | — | — | — | — | AP3 MAC ADDRESS | — | — |
| THE NUMBER OF ACCESS-POINT-CONNECTED TERMINALS | N1 | — | — | — | — | N2 | — | — | — | — | N3 | — | — |
| COMMUNICATION RATE | T1 | — | — | — | — | T2 | — | — | — | — | T2 | — | — |
| RECEIVED SIGNAL STRENGTH | A1 | — | — | — | — | A2 | — | — | — | — | A3 | — | — |
| INTERFERENCE SIGNAL STRENGTH | — | B1 | — | — | — | — | — | B2 | — | — | — | — | — |
| PER ESTIMATION | P1 | — | — | — | — | P2 | — | — | — | — | P3 | — | — |
| THROUGHPUT ESTIMATION | TP1 | — | — | — | — | TP2 | — | — | — | — | TP3 | — | — |

# WIRELESS APPARATUS AND METHOD OF SELECTING WIRELESS ACCESS POINT

FIELD OF THE INVENTION

The present invention relates to a wireless apparatus, which performs communication using radio, such as a wireless LAN (local area network), and a method of selecting a wireless access point.

BACKGROUND

In recent years, a computer network using radio is widely used. Particularly in companies, a wireless LAN is widely used because an effort for installing wireline LAN cable or an effort for reinstalling wireless LAN cable due to layout change is not needed. In addition, a trend of using a wireless LAN as a public network service has appeared.

A physical layer or a MAC (medium access control) layer of a wireless LAN is standardized as IEEE802.11, and the standard is typically used in a wireless LAN of a company or a home.

In the wireless LAN, a range where a radio wave can reach is about 100 m, and accordingly, it is necessary to provide several wireless access points in order to cover a wide range of area. In addition, since the number of communication channels for performing wireless communication is limited and interference between communication channels may occur, it is necessary to make a study of an installation place so that the wireless communication is not affected between wireless access points or to set a channel where interference does not occur.

However, even if channels of wireless access points are assigned within a company and installation is properly made such that interference between the wireless access points does not occur, a radio wave from a wireless access point located in a department may reach a wireless access point located in another department, or a radio wave from another company may reach the company according to circumstances, a street being located between the company and another company. The radio waves from other wireless LANs have an adverse effect on wireless communication within a company, as interference waves.

Further, if a public wireless LAN service becomes popular and thus service providers install wireless access points at possible places, it is expected that a problem due to the radio wave interference will be more serious.

In the case of a wireless LAN, a range where a radio wave can reach in a wireless access point is limited. Accordingly, in order to perform wireless communication over a wide range that cannot be covered by one wireless access point, several wireless access points are generally provided such that communication ranges overlap one another to some degree so as to prevent a region where a radio wave does not reach from occurring.

In the related art, in the case when a plurality of access points exist, there has been proposed a method of selecting a wireless access point determined that the received signal strength is highest or a method of selecting a channel in which power of an interference wave is lowest.

On the other hand, in Non-patent Document 1, a method is proposed in which a weighting function corresponding to a communication throughput is calculated on the basis of equation 1 and then a wireless access point having a highest weighting function is selected.

$$W_{STA} = (1-P)/N \quad \text{(Equation 1)}$$

Here, $W_{STA}$ is a weighting function at the time of communication with a wireless access point, N is the number of wireless terminals connected with a wireless access point, and P is a packet error rate at the time of communication with a wireless access point.

However, in the method of selecting a wireless access point determined that the received signal strength is highest, interference is not considered. As a result, a probability that a communication error will occur increases if an interference source exists within a close range, which lowers the communication throughput.

Moreover, even in the method of selecting a channel in which the power of an interference wave is lowest, if a received radio wave of the selected wireless access point is weak, the probability that a communication error will occur increases, which also lowers the communication throughput.

Furthermore, in Non-patent Document 1, even though the method of selecting a wireless access point on the basis of the weighting function is proposed, it is not clear how to practically obtain the packet error rate before a wireless terminal is connected with a wireless access point so as to perform communication. In addition, Non-patent Document 1 does not disclose how to obtain the number of wireless terminals connected with the wireless access point.

[Non-patent Document 1] FUKUDA, Yutaka; ABE, Takamitsu; OIE, Yuji; "Decentralized Access Point Selection Architecture for Wireless LANs", Wireless Telecommunications Symposium 2004, SA3, Pomona, Calif., USA, May 14-15 2004

SUMMARY

According to an aspect of the invention, a wireless apparatus that selects one of a plurality of wireless access points so as to perform wireless communication therewith is configured to include: a scanning unit that scans accessible wireless access points; a calculating unit that calculates an estimated communication efficiency value of each wireless access point on the basis of received signal strength, interference signal strength, and interference adjacency of each of the scanned wireless access points; and a selecting unit that selects one of the scanned wireless access points on the basis of the estimated communication efficiency values calculated by the calculating unit.

BRIEF DESCRIPTION OF THE SEVERAL VIEWS OF DRAWINGS

FIG. 8 is a view illustrating information elements of IEEE 802.11;

FIG. 15 is a view illustrating an example of a variety of information stored in a wireless access point list memory in the present embodiment;

DETAILED DESCRIPTION

Hereinafter, embodiments of the invention will be described.

Even though wireless data transmitted/received between wireless apparatuses may be expressed by a frame, in the present embodiment, the wireless data is expressed by a packet or a frame and the packet or the frame has the same meaning herein. In addition, being connected with a wireless access point means a state in which it is possible to perform data communication with a predetermined wireless access point (in IEEE 802.11 wireless LAN, being connected with a wireless access point also means being associated with a wireless access point).

Moreover, the number of wireless terminals connected with a wireless access point means the number of wireless terminals that are in the state communicable with the wireless access point. For example, in IEEE 802.11 wireless LAN, the number of wireless terminals connected with a wireless access point indicates the number of wireless terminals that are being associated with the wireless access point.

Further, a wireless terminal means, for example, a terminal in which a wireless device such as a wireless LAN card is installed in a PC so as to communicate with a wireless access point, a terminal in which a wireless device, such as a wireless LAN module based on a wireless LAN, is installed in an IP (Internet protocol) so as to communicate with a wireless access point, or a terminal in which a wireless apparatus operates as a wireless terminal.

Furthermore, the wave strength at the time of receiving a radio wave is referred to as received signal strength and is strength of a received wave that can be quantitatively measured at the receiving side. For example, the wave strength at the time of receiving a radio wave is a value expressed by received power, received signal strength indicator (RSSI), an S/N ratio of a received signal, or the like. In the same manner as the received signal strength, the interference signal strength also indicates strength of an interference wave that can be quantitatively measured.

In addition, in the embodiments of the invention, an explanation will be made on the basis of IEEE 802.11 wireless LAN. However, the invention is not limited thereto. For example, the invention may be applied to Bluetooth, WiMAX, or UWB that performs communication by using radio, as long as the received signal strength or the interference signal strength can be measured.

First Embodiment

Figure 1:
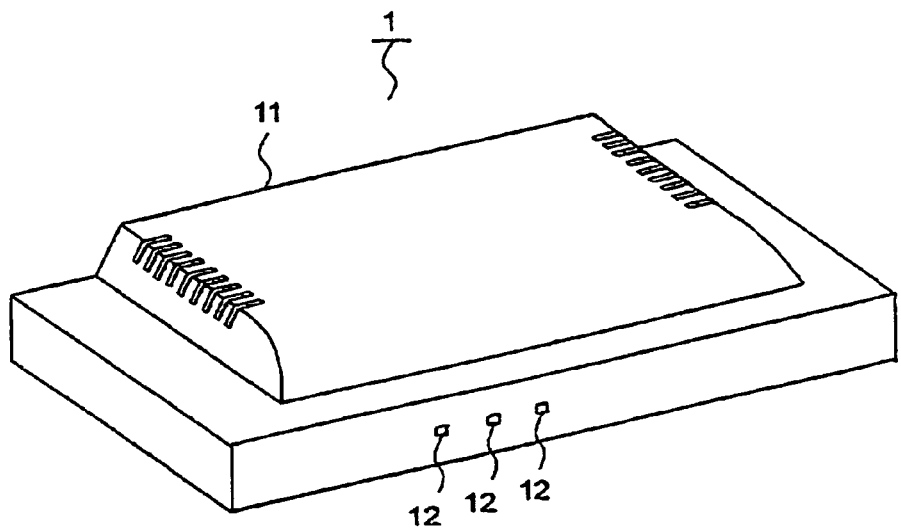
FIG. 1 is a perspective view illustrating a front side of an example of a wireless access point in a first embodiment.
Figure 2:
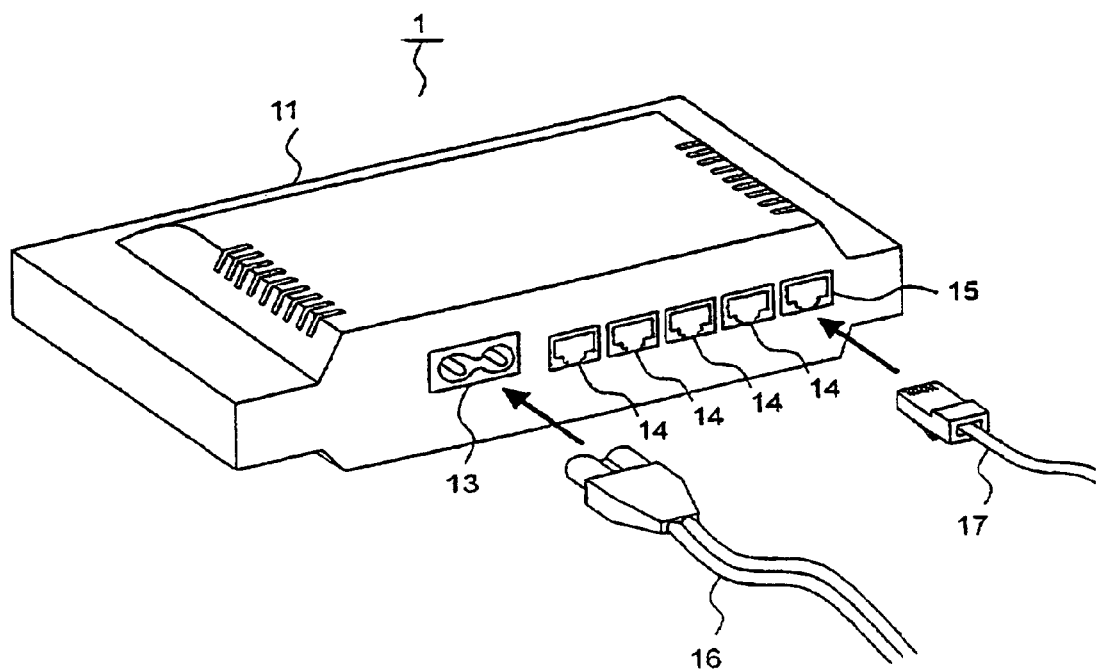
FIG. 2 is a perspective view illustrating a rear side of an example of a wireless access point in the first embodiment.

FIG. 1 is a perspective view illustrating a front side of an example of a wireless access point, and FIG. 2 is a perspective view illustrating a rear side of an example of a wireless access point.

A wireless access point 1 shown in FIG. 1 is a router.

The wireless access point has a case 11, and a display unit 12 such as an LED (light emitting diode) is provided on a front surface of the case 11. On the rear side of the case 11, a DC (direct current) power connector 13, a LAN (local area network) modular jack 14 such as an RJ45, and a WAN (wide area network) modular jack 15 are provided, as shown in FIG. 2. As shown in FIG. 2, a power line 16 such as a parallel cable is connected to the DC power connector 13. A LAN cable 17 is connected to the modular jacks 14 and 15.

In addition, even though the router is shown as an example of the wireless access point 1 in FIGS. 1 and 2, the wireless access point 1 is not specifically limited to the router. For example, the wireless access point 1 may be a wireless access point 1 having only a bridge function or an apparatus (for example, an electronic appliance such as a television) having a function of a wireless access point.

Figure 3:
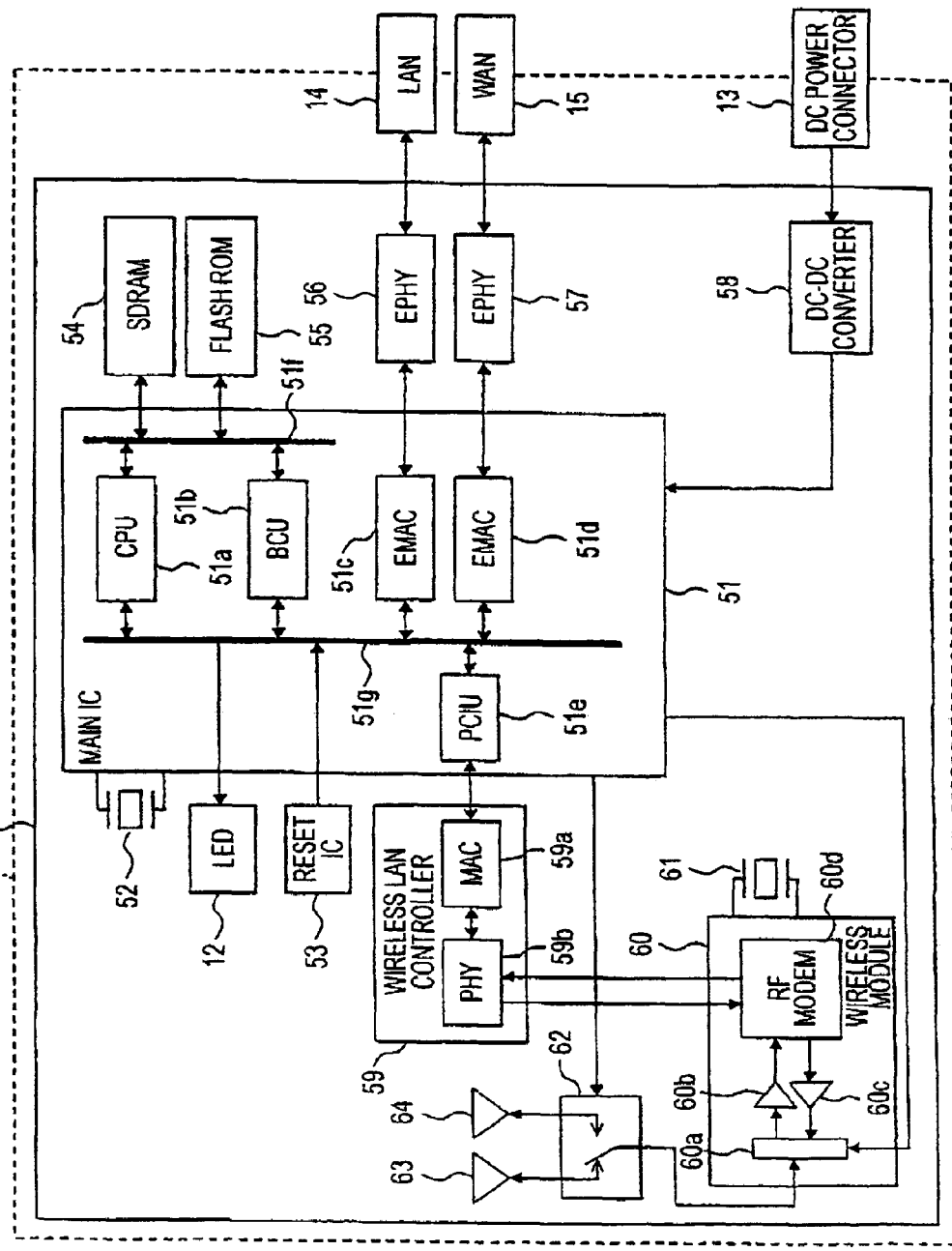
FIG. 3 is a block diagram illustrating an example of hardware of a wireless access point in the first embodiment.

FIG. 3 is a block diagram illustrating an example of hardware of a wireless access point.

As shown in FIG. 3, the wireless access point 1 includes a circuit module 50 within the case 11 indicated by a dotted line. In the circuit module 50, a main IC (integrated circuit) 51, a wireless LAN controller 59, and a wireless module 60 are mounted.

The main IC 51 includes a CPU (Central Processing Unit) 51a, a main bus 51f and a local bus 51g serving as buses, a BCU (bus control unit) 51b that controls the flow of data on a bus, MAC blocks (EMAC) 51c and 51d that control an MAC (medium access control) layer of Ethernet (registered trademark), and a PCIU 51e that controls a PCI (peripheral component interconnect unit) bus.

The CPU 51a and the BCU 51b in the main IC 51 are connected to an SDRAM (synchronous dynamic random access memory) 54 and a flash ROM (flash read only memory) 55 through the main bus 51f. In addition, the CPU 51a and the BCU 51b are connected, through the local bus 51g, to an oscillator 52 that supplies a clock to the main IC 51, a display unit 12 such as an LED, and a reset IC 53 that outputs an initialization signal to the main IC 51.

The MAC blocks 51c and 51d in the main IC 51 are respectively connected to PHY (physical layer) ICs 56 and 57 of Ethernet (registered trademark), and the PHY (physical layer) ICs 56 and 57 are respectively connected to the WAN modular jack 14 and the LAN modular jack 15. In addition, the main IC 51 is connected to a DC power connector 13 through a DC-DC (direct current to direct current) converter 58. The DC-DC converter 58 converts a DC voltage, which is supplied from the DC power connector 13, to a DC voltage needed in the main IC 51.

The wireless LAN controller 59 includes an MAC block 59a that controls an MAC layer and a PHY block 59b that controls a physical layer. The PCIU 51e in the main IC 51 is connected to the PHY block 59b through the MAC block 59a.

In the wireless module 60, a transmission state or a reception state thereof is set by the main IC 51. In addition, the wireless module 60 includes a transmission/reception switching switch 60a, an LNA (low noise amplifier) 60b that amplifies a received signal, a PA (power amplifier) 60c that amplifies a signal to be transmitted, and an RF (radio frequency) modem 60d that performs a modulation to a wireless signal and a demodulation from a wireless signal.

The wireless module 60 is connected to an oscillator 61 that supplies a clock to thereto, and the RF modem 60d in the wireless module 60 is connected to the PHY block 59b in the wireless LAN controller 59. The transmission/reception switching switch 60a in the wireless module 60 is connected to an antenna 63 or 64 through an antenna switching switch 62 that switches between antennas used by the main IC 51.

Figure 4:
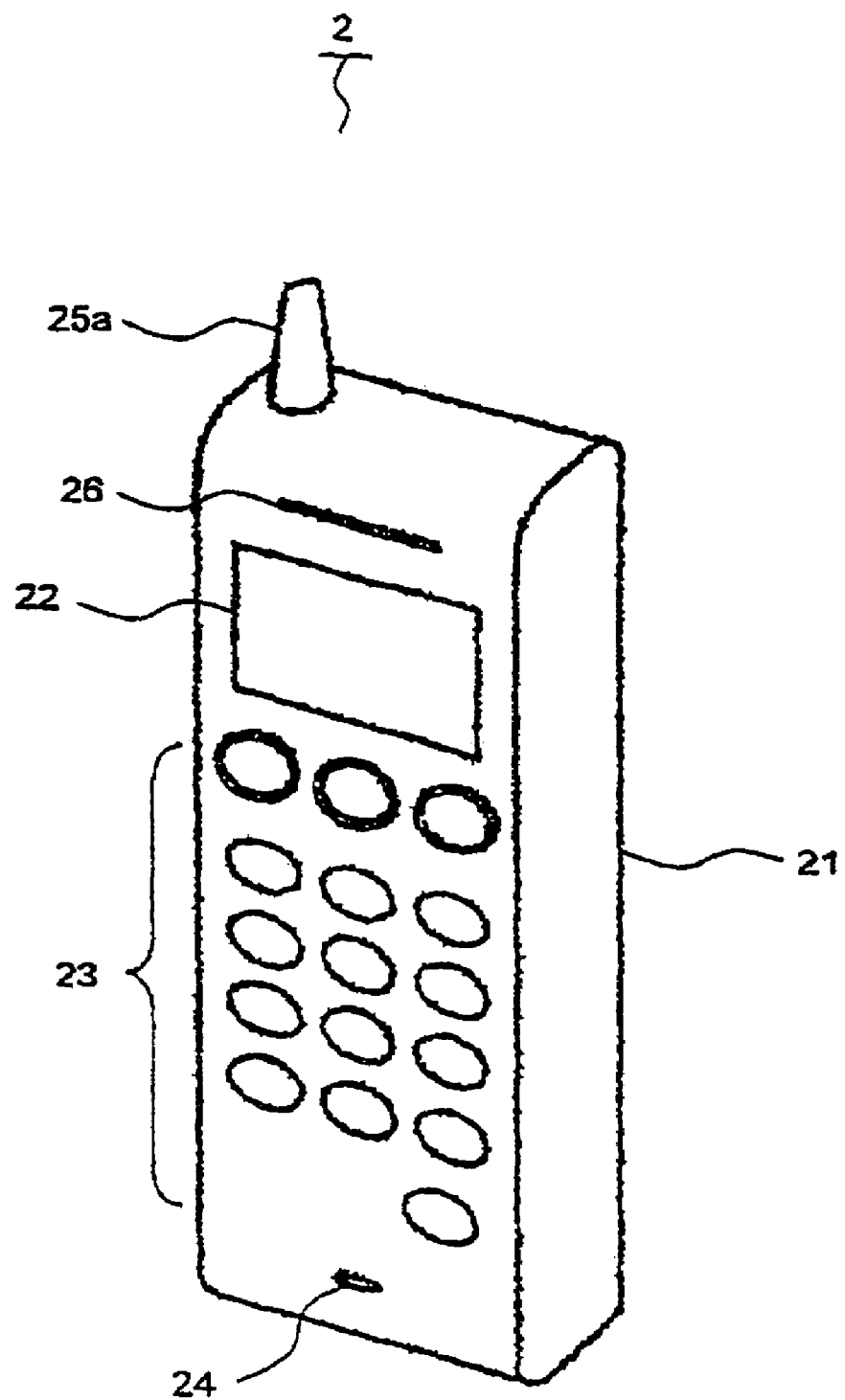
FIG. 4 is a perspective view illustrating an example of a wireless apparatus in the first embodiment.

FIG. 4 is a perspective view illustrating an example of a wireless apparatus.

A wireless apparatus 2 in the present embodiment is a portable phone, as shown in FIG. 4.

The wireless apparatus 2 has a case 21 in which an LCD (liquid crystal display) 22 displaying a phone number and the like, a key matrix 23 having buttons for indicating a phone number, a microphone 24, an external antenna 25a by which a radio wave is transmitted or received, and a speaker 26 from which a voice from a communicating party is output are provided.

In addition, even though the phone is shown as an example of the wireless apparatus 2, the wireless apparatus 2 is not specifically limited to the phone. For example, the wireless apparatus 2 may be an apparatus (for example, an electronic apparatus such as a PC) having a function allowing the apparatus to be connected to the wireless access point 1.

Figure 5:
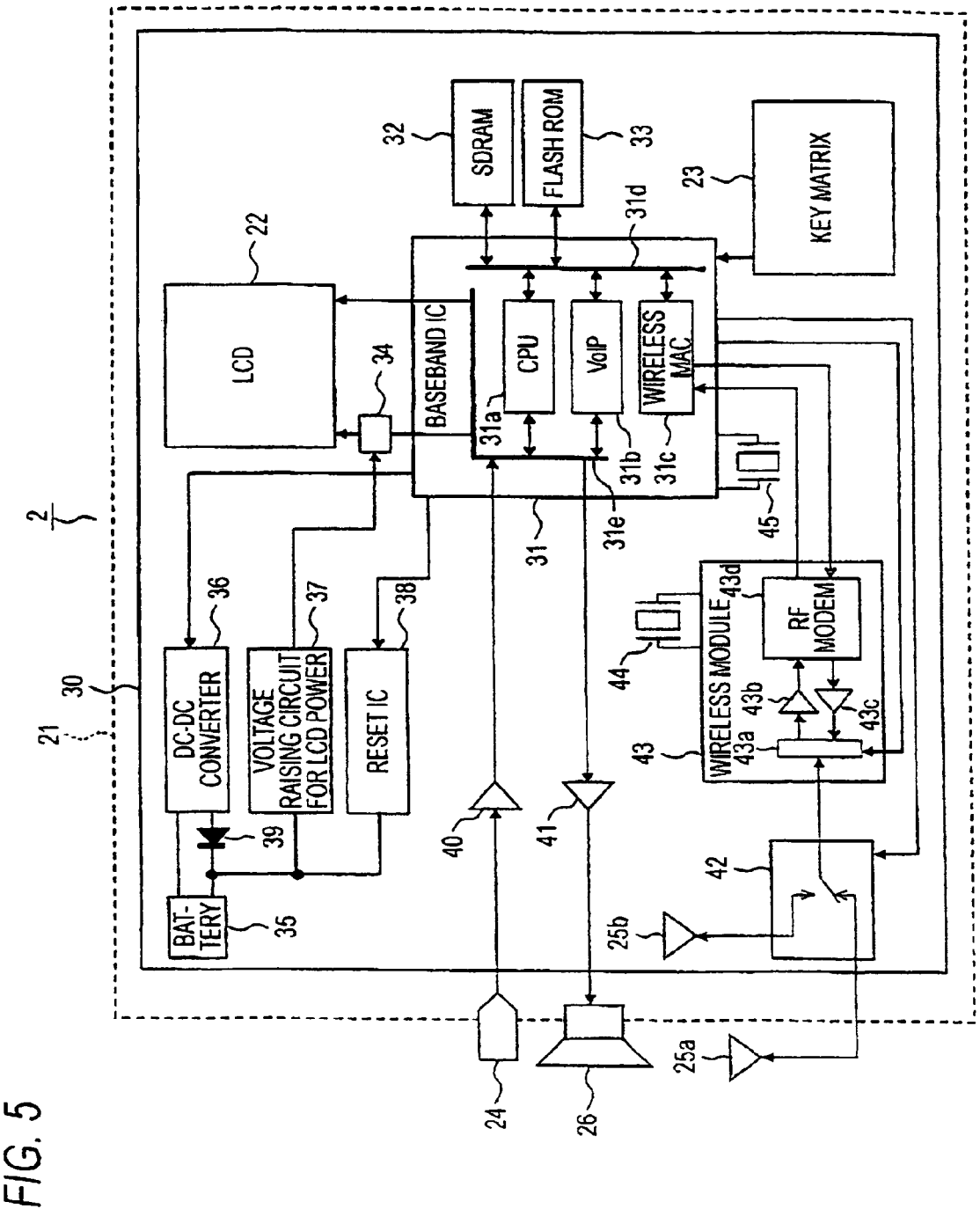
FIG. 5 is a block diagram illustrating an example of hardware of the wireless apparatus in the first embodiment.

FIG. 5 is a block diagram illustrating an example of hardware of a wireless apparatus.

As shown in FIG. 5, the wireless apparatus 2 includes a circuit module 30 within the case 21 indicated by a dotted line. In the circuit module 30, a baseband IC 31 and a wireless module 43 are mounted in addition to the LCD 22 and the key matrix 23 described in FIG. 4.

The baseband IC 31 includes a CPU (central processing unit) 31a, a VoIP (voice over Internet protocol) block 31b that performs voice processing, a wireless MAC block 31c that controls an MAC layer of a wireless LAN, and a local bus 31d and a local bus 31e serving as buses.

The CPU 31a, the VoIP block 31b, and the wireless MAC block 31c in the baseband IC 31 are connected to an SDRAM 31 and a flash ROM 33 through a main bus 31d. In addition, the CPU 31a and the VoIP block 31b are connected, through the local bus, to an LCD 22, an LCD power control IC 34 that controls power of the LCD 22, a DC-DC converter 36 that performs conversion to a required DC voltage, and a reset IC 38 that outputs an initialization signal to the baseband IC 31. The DC-DC converter 36 is connected to a battery 35 with a diode 39 interposed therebetween, and the reset IC 38 and a voltage raising circuit 37 for LCD power that raises a voltage to a voltage required for the LCD 22 are connected to the battery.

Moreover, the CPU 31a and the VoIP block 31b are connected to an amplifier 40 that amplifies a signal from a microphone 24 and an amplifier 41 that amplifies a signal toward a speaker 26 through the local bus 31e, respectively. The amplifier 40 is connected to the microphone 24 and the amplifier 41 is connected to the speaker 26. In addition, the baseband IC 31 is connected to a key matrix 23, an oscillator 45 that supplies a clock to the baseband IC 31, the wireless module 43, and an antenna switching switch 42 that switches between antennas used by the baseband IC 31.

The wireless module 43 includes a transmission/reception switching switch 43a, an LNA (low noise amplifier) 43b that amplifies a received signal, a PA (power amplifier) 43c that amplifies a signal to be transmitted, and an RF (radio frequency) modem 43d that performs a modulation to a wireless signal and a demodulation from a wireless signal. Further, the wireless module 43 is connected to the antenna switching switch 42 and an oscillator 44 that supplies a clock to the wireless module 43. The antenna switching switch 42 is connected to the external antenna 25a described in FIG. 4 and an internal antenna 25b.

In addition, even though a case in which the baseband IC 31 includes the CPU 31a, the VoIP block 31b, and the wireless MAC block 31c has been exemplified, the baseband IC 31 may include one chip or a plurality of chips.

Here, it will be described about an interference adjacency, which is a term defined in the present embodiment.

In a wireless LAN such as IEEE802.11b/g, the closer interference adjacencies are, the stronger an effect of interference is. The interference adjacency indicates how many channels a channel used by a wireless access point and a channel corresponding to an interference wave are apart from each other. For example, assuming that a channel used by a wireless access point is a CH1, an interference adjacency when an interference wave exists in a CH2 is 1 (equal to adjacent interference), an interference adjacency when an interference wave exists in a CH3 is 2 (equal to two adjacent interference), an interference adjacency when an interference wave exists in a CH4 is 3 (equal to three adjacent interference), and an interference adjacency when an interference wave exists in a CH5 is 4 (equal to four adjacent interference). That is, the interference adjacency represents how close the channel corresponding to the interference wave is located with respect to the channel used by the wireless access point.

Figure 6:
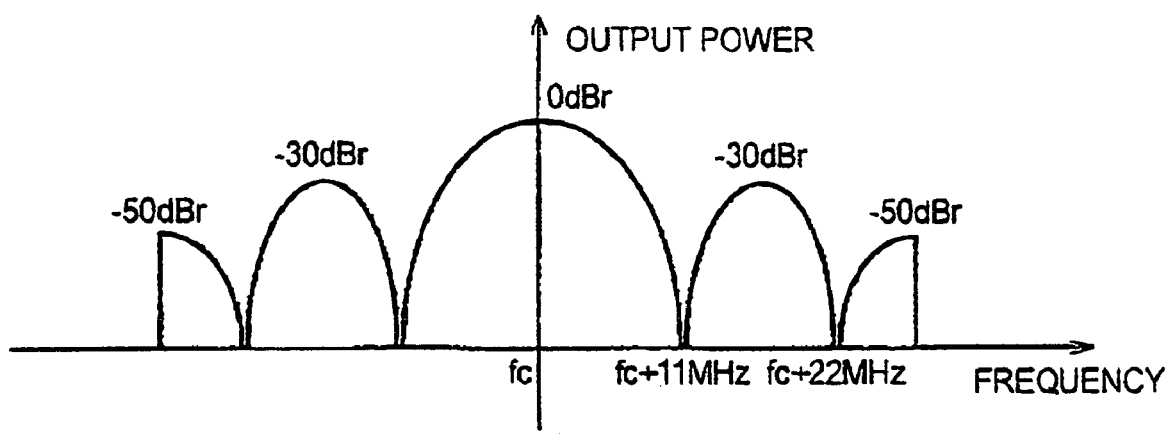
FIG. 6 is a view illustrating energy diffusion in a transmission channel of IEEE 802.11.

FIG. 6 shows that the closer the interference adjacencies are, the stronger the effect of the interference is. According to '15.4.7.4 Transmit spectrum mask' disclosed in IEEE802.11, in energy diffusion in a wireless transmission channel, an output level increases as closer to a center frequency, as shown in FIG. 6. For this reason, in the case when adjacent channels are only 5 MHz apart from each other in the same manner as in IEEE802.11b/g, the closer channels from which radio waves are generated are to each other, the larger the overlapping amount of outputs from the channels is, and in addition, a high-level overlapping occurs, which causes a channel to be easily affected due to interference. Thus, it can be seen that the closer the interference adjacencies are, the effect of interference becomes large because the corresponding channels are located close to each other. That is, it is necessary to not only examine strength of an interference signal but also to consider the interference adjacency before considering the effect of interference.

In a wireless LAN, assuming that there is no conflict between packets and a wireless access point provides the same communication chance to each wireless terminal, the throughput when a predetermined wireless terminal communicates with the predetermined wireless access point may be calculated by using equation 2 with reference to Non-Patent Document 1.

$$TP_{STA}=(1-PER_{STA}) \times TP_{AP}/N_{AP} \quad \text{(Equation 2)}$$

Here, $N_{AP}$ is the number of wireless terminals connected with a wireless access point, $TP_{AP}$ is transmission rate that can be supplied by the wireless access point, $PER_{STA}$ is a packet error rate when communicating with the wireless access point, and $TP_{STA}$ is communication throughput that can be expected when communicating with the wireless access point.

Equation 2 means that, assuming that the transmission rate that can be supplied by a wireless access point is $TP_{AP}$, $TP_{STA}=TP_{AP}$ if one wireless terminal can occupy the wireless access point, but $TP_{STA}=TP_{AP}/N_{AP}$ if $N_{AP}$ wireless terminals share the wireless access point. In addition, an error rate when communicating with the wireless access point is $PER_{STA}$, the throughput is reduced by $(1-PER_{STA})$, and as a result, the throughput becomes $(1-PER_{STA}) \times TP_{AP}/N_{AP}$.

Accordingly, if the number of wireless terminals connected with a wireless access point (hereinafter, referred to as 'the number of access-point-connected terminals), the transmission rate that can be supplied by the wireless access point, and the packet error rate when communicating with the wireless access point can be known, it is possible to calculate the communication throughput when communicating with the wireless access point.

Here, since the number of access-point-connected terminals is information of the wireless access point, the wireless terminal cannot know the number of access-point-connected terminals. For this reason, the number of access-point-connected terminals needs to be notified from a wireless access point to a wireless terminal by using a predetermined method. For example, it is possible to consider a method of notifying the wireless terminal of the number of access-point-connected terminals by using a beacon or a probe response from a wireless access point. That is, the wireless terminal may discover a wireless access point by receiving a beacon frame from the wireless access point or by requesting the wireless access point of a probe response and then receiving the probe response frame from the wireless access point. Thus, a variety of information on the wireless access point may be obtained. Accordingly, it is considered that the number of access-point-connected terminals is notified by using these frames described above.

Figure 7:
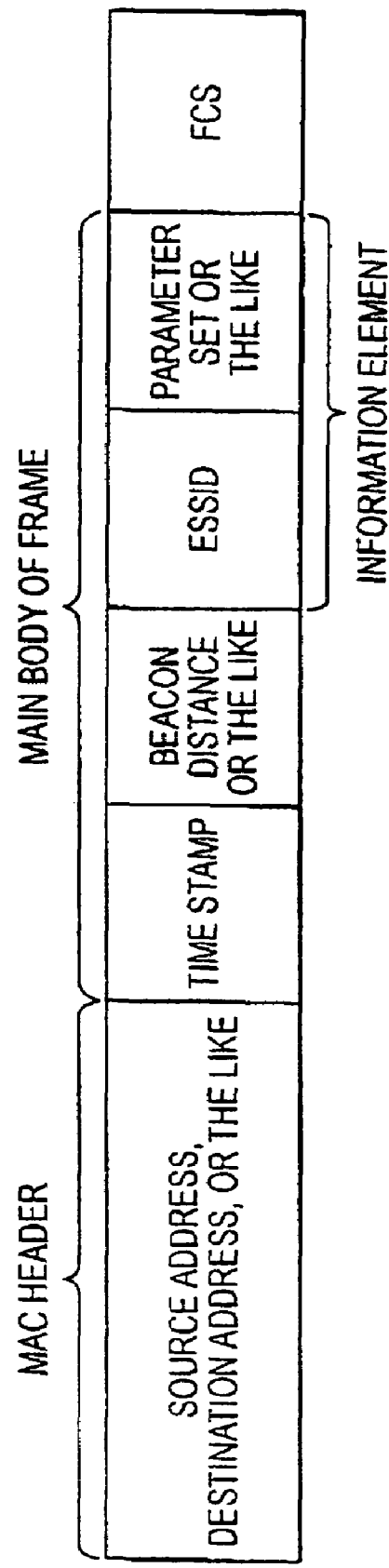
FIG. 7 is a view illustrating a beacon frame transmitted from a wireless access point of IEEE 802.11.

Here, a view illustrating a frame format outline of a beacon frame transmitted from a wireless access point in IEEE 802.11 is shown in FIG. 7. The beacon frame includes information on a source and a destination, which exist in an MAC header, and a variety of information, such as ESSID or a parameter set depending on a communication method. In addition, the probe response includes the same information described above. The information is defined as information elements in IEEE802.11, as shown in FIG. 8.

Thus, by additionally defining the number of access-point-connected terminals as one of the information elements and then adding the defined information element in a beacon or a probe response, the number of access-point-connected terminals can be notified to the wireless terminal.

As described above, the number of access-point-connected terminals added in the beacon or the probe response can be notified from the wireless access point to the wireless terminal. At this time, if a wireless access point that has not notified the number of access-point-connected terminals exists, the throughput may be calculated by using the following equation 3. In this equation, a throughput when performing communication occupying a wireless access point may be considered at a predetermined packet error rate.

$$TP_{STA}=(1-PER_{STA}) \times TP_{AP} \quad \text{(Equation 3)}$$

The transmission rate that can be supplied by a wireless access point can be obtained on the basis of a communication method adopted by the wireless access point. If the wireless access point adopts an IEEE 802.11b wireless LAN, the transmission rate is 11 Mbps, and if the wireless access point adopts an IEEE 802.11g wireless LAN, the transmission rate is 54 Mbps.

In the present embodiment, an experiment of calculating a packet error rate (hereinafter, referred to as a 'PER') has been performed to obtain relationship between received signal strength and interference situation and the PER.

Figure 9:
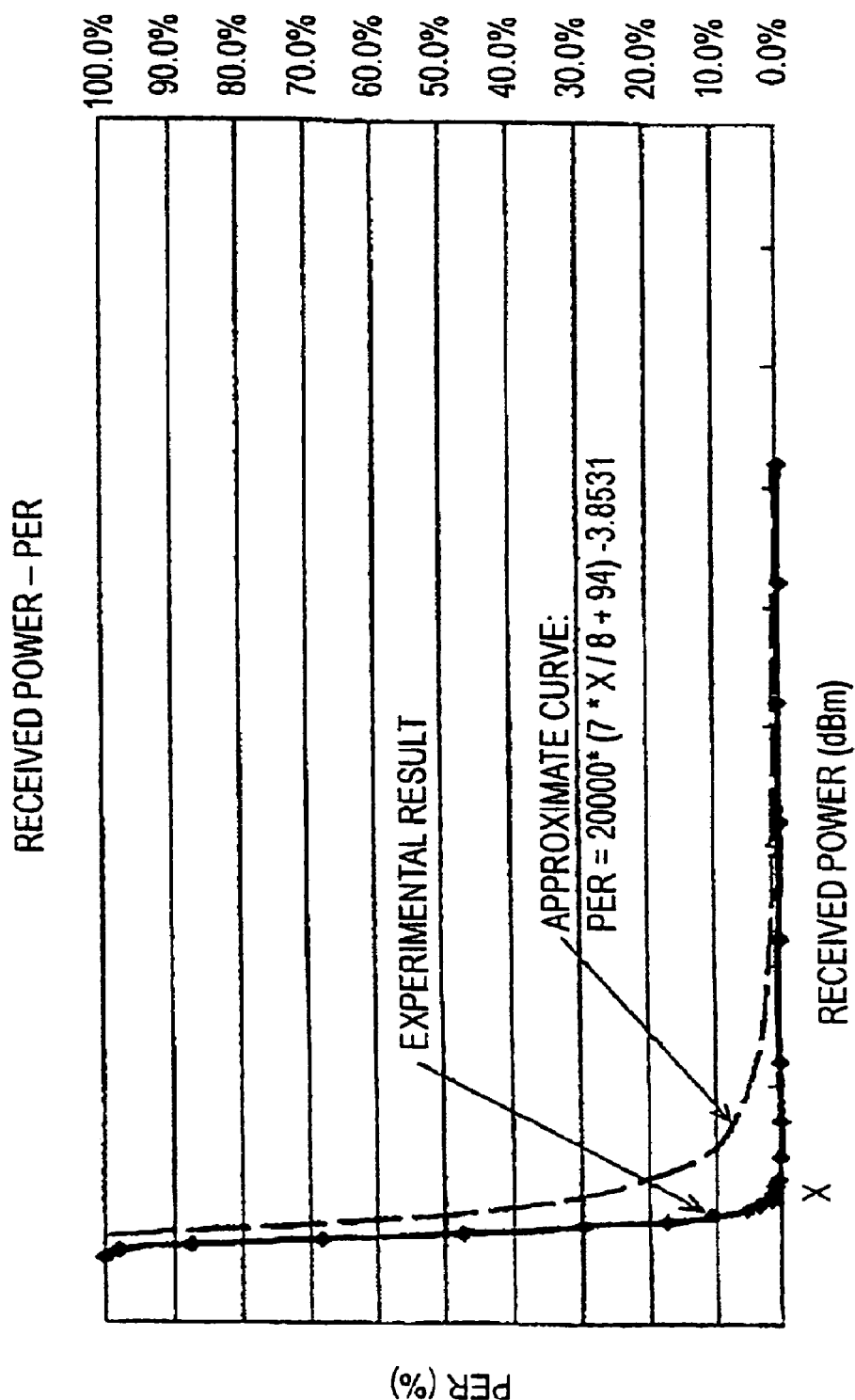
FIG. 9 is a view illustrating received power versus PER when there is no interference in the present embodiment.

In a first experiment, a PER at a receiving side was measured while changing the transmission power at a transmitting side. A result of the first experiment is shown in FIG. 9. Here, the received power (received signal strength) in FIG. 9 is calculated by using equation 4.

Received signal strength (received power)=transmission power−signal attenuation amount in transmission path (Equation 4)

Referring to FIG. 9, it can be seen that, when the received power is lower than a predetermined level (XdBm), a packer error is abruptly generated (hereinafter, 'packer error is abruptly generated' is described as 'PER increases'). Here, in the experiment, 'X' is −90 dBm. Since the receiving level X is a level at which the PER starts to occur, the receiving level X may be considered as a minimum receive sensitivity of a wireless apparatus used in the experiment. Accordingly, 'X' is assumed to indicate the minimum receive sensitivity.

By using the experimental result, the PER can be calculated if it is possible to know the received power (received signal strength) when there is no interference. However, referring to the experimental result, even if the received power changes slightly around the level X, the PER becomes zero or reach a several tens of percentage point, and as a result, it is expected that the PER will be greatly changed.

For this reason, it is preferable to consider a possibility that a packet error will occur to some degree by predicting the change of the received power when the received power is close to the level X. Accordingly, when the minimum receive sensitivity X is −90 dBm, an approximate equation of received power versus PER shown in the following equation 5 is used instead of a chart of the experimental result.

$$PER=20000(7 \times x/8+94)^{-3.8531} \quad \text{(Equation 5)}$$

Here, 'x' is received power. By using an approximate curve as expressed in equation 5, it is possible to calculate the PER in consideration of change of the received power. That is, in the approximate curve, if the received power lowers by a predetermined level, it is assumed that a packet error may occur due to the change of the received power and then the PER gradually increases at a point larger than the level X, even though the packet error does not occur in the experiment. In addition, since the approximate equation where the packet error occurs faster than in the experiment is used, a more stable wireless access point can be selected.

Consequently, if it is possible to know the received power (received signal strength) by using the approximate curve, the PER can be simply calculated. Here, in the case of a wireless apparatus having different minimum receive sensitivity, it is preferable to use a graph obtained by moving a graph expressed by equation 5 parallel in the direction of the received power. In addition, the approximate equation expressed in equation 5 is only an example. Therefore, without being limited to the calculating equation, the approximation may be made by using the following function.

$$PER = 2.7697 \times e^{-0.1642} \times (7 \times x/8 + 94) \quad \text{(Equation 6)}$$

Figure 10:
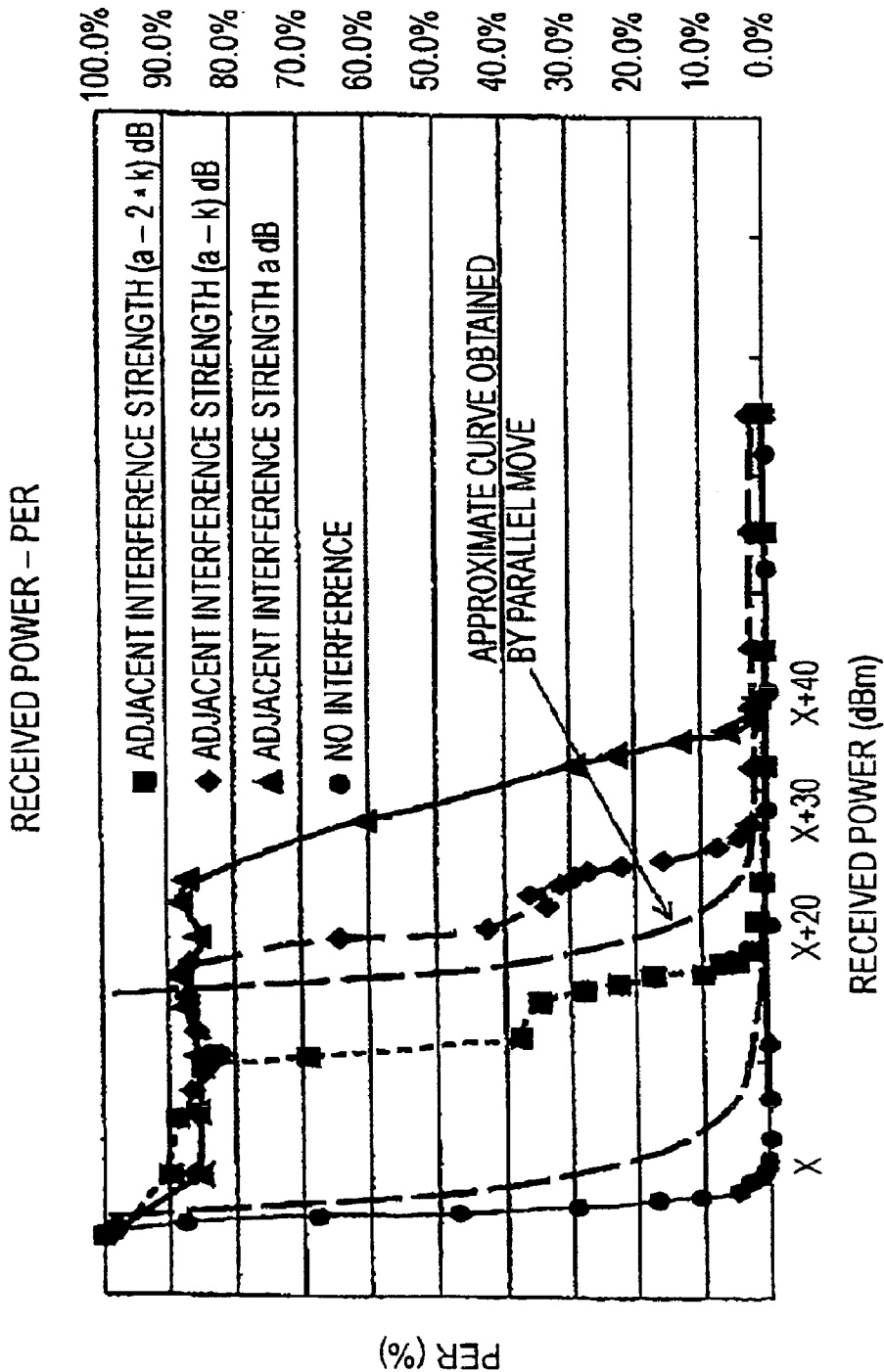
FIG. 10 is a view illustrating received power versus PER when there is interference in an adjacent channel in the present embodiment.

In a second experiment, a PER at a receiving side was measured while generating an interference wave in an adjacent channel and then changing the strength of several interference signals and the transmission power at a transmitting side. A result of the second experiment is shown in FIG. 10. Here, the received power (received signal strength) is calculated by using equation 4.

Referring to FIG. 10, as the interference signal strength is large, a level of the received power at which the PER increases becomes large. That is, it can be seen that the packet error occurs easily as interference is strong even if the received power is large. Specifically, the level of received power at which PER increases becomes large in proportion to the interference signal strength. As a result, the level of received power at which PER increases may be assumed on the basis of the following equation 7. Here, in this experiment, 'a' is about −58.5 dBm, and 'k' is about 10 dBm.

In the case of an interference adjacency of '1' and interference signal strength of 'a+r', $$\text{Level of received power at which PER increases} = (X + 40) + (r/k) \times 10 \quad \text{(Equation 7)}$$

Figure 11:
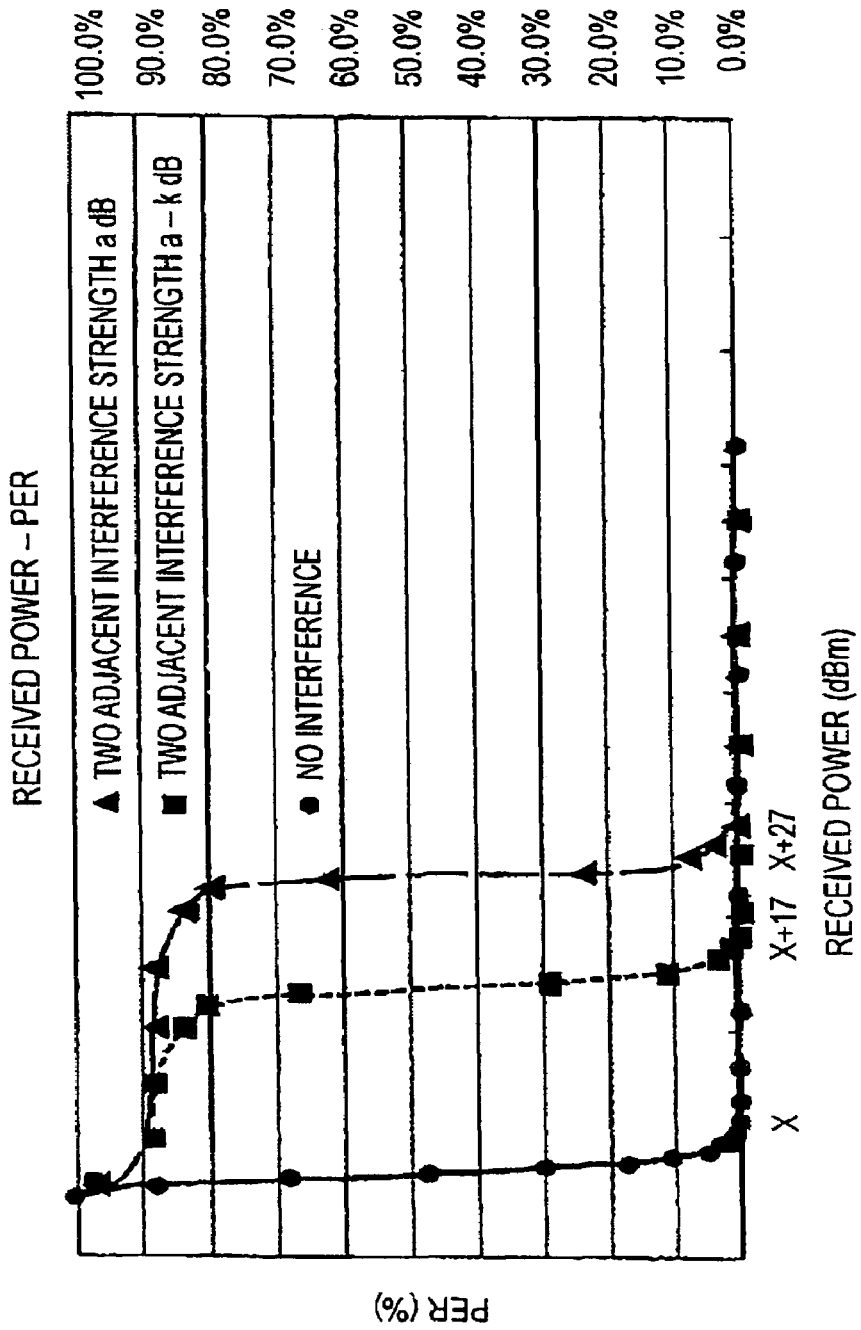
FIG. 11 is a view illustrating received power versus PER when there is interference in a two adjacent channel in the present embodiment.

In a third experiment, a PER at a receiving side was measured while generating an interference wave in a '2' adjacent channel and then changing the strength of several interference signals and the transmission power at a transmitting side. A result of the third experiment is shown in FIG. 11. Here, the received power (received signal strength) is calculated by using equation 4.

Referring to FIG. 11, it can be seen that the same result as in the second experiment is obtained, and the level of received power at which PER increases may be assumed on the basis of the following equation 8.

In the case of an interference adjacency of '2' and interference signal strength of 'a+r', $$\text{Level of received power at which PER increases} = (X + 27) + (r/k) \times 10 \quad \text{(Equation 8)}$$

Figure 12:
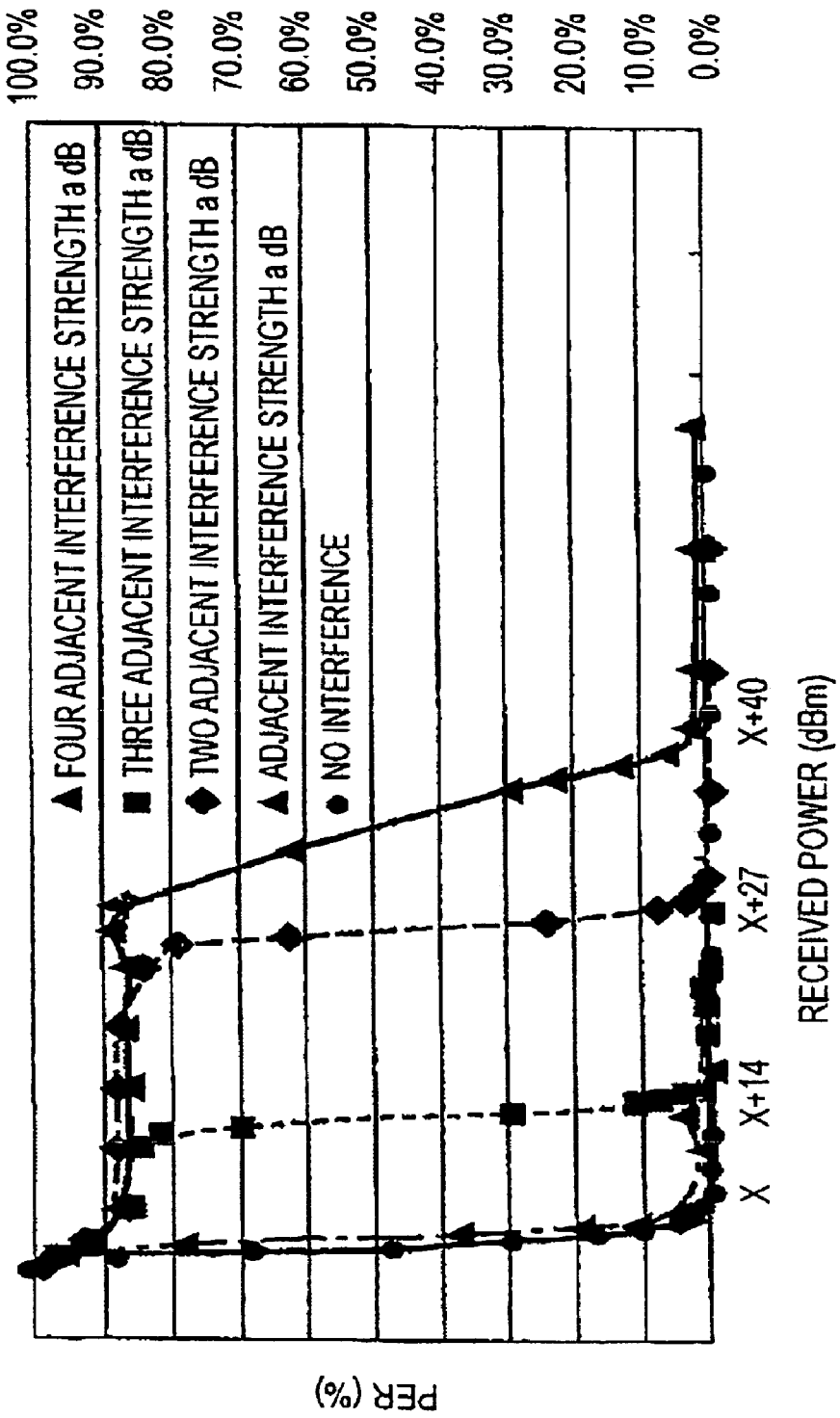
FIG. 12 is a view illustrating received power versus PER when interference corresponding to several interference adjacencies exists in the present embodiment.

In a fourth experiment, an experiment of changing the interference adjacency was performed. That is, the PER at the receiving side was measured while changing the transmission power at the transmitting side, under a state in which an interference wave is generated in the interference adjacency 1 (adjacent), the interference wave is generated in the interference adjacency 2 (two adjacent), the interference wave is generated in the interference adjacency 3 (three adjacent), or the interference wave is generated in the interference adjacency 4 (four adjacent). Here, the interference signal strength is constant. A result of the fourth experiment is shown in FIG. 12. Here, the received power (received signal strength) is calculated by using equation 4.

Referring to FIG. 12, it can be seen that the level of received power at which PER increases changes in proportion to the interference adjacency. As a result, the level of received power at which the PER increases may be assumed on the basis of the following equation 9.

In the case of interference signal strength of 'a' and an interference adjacency of 'd', $$\text{Level of received power at which PER increases} = (X + 40) - (d - 1) \times 13 \quad \text{(Equation 9)}$$

Thus, from equation 7, equation 8, and equation 9 described above, the level of received power at which PER increases in the case of interference signal strength of 'a+r' and an interference adjacency of 'd' can be obtained on the basis of equation 10.

In the case of a minimum receive sensitivity of 'X' and interference signal strength of 'a+r', $$\text{Level of received power at which PER increases} = (X + 53 - 13 \times d) + (r/k) \times 10 \quad \text{(Equation 10)}$$

By using equation 10, it is possible to know the level of received power at which PER increases in the case of predetermined interference signal strength and a predetermined interference adjacency. As described above, if it is possible to know the level of received power at which PER increases, an approximate curve of an approximate equation of received power versus PER in the case of predetermined interference signal strength and a predetermined interference adjacency can be obtained by moving the approximate curve (equation 5) of received power versus PER in the case when there is not interference parallel by 'level of received power at which PER increases −X'.

Here, the parallel moving amount is equal to or larger than zero. FIG. 10 shows an example in which the approximate curve expressed by equation 5 is moved in parallel by '20'. By using the calculated approximate curve of received power versus PER, it is possible to simply calculate a PER from the received power.

On the basis of the experimental results described above, the approximate equation of received power versus PER (refer to equation 5) and the level of received power at which PER increases (refer to equation 10). Thus, it is possible to calculate an estimated PER value in the case of predetermined interference signal strength, a predetermined interference adjacency, and predetermined received signal strength (received power). Here, the PER has been calculated by using equation. However, it may be possible to use a-method in which relationship between interference signal strength, interference adjacency, received signal strength, and PER is stored beforehand in two-dimensional table and then the PER is calculated by referring to the table.

As described above, it can be seen that if it is possible to know the received signal strength transmitted from a wireless access point, the strength of an interference signal existing at a peripheral channel used by the wireless access point, and the interference adjacency thereof, the estimated PER value can be calculated. Accordingly, by using the PER, the number of access-point-connected terminals, and the transmission rate that can be supplied by a wireless access point described above, it is possible to estimate the communication throughput when being connected with the wireless access point on the basis of equation 2 or equation 3 using the PER the throughput.

Next, an operation of a wireless apparatus will be described.

Figure 13:
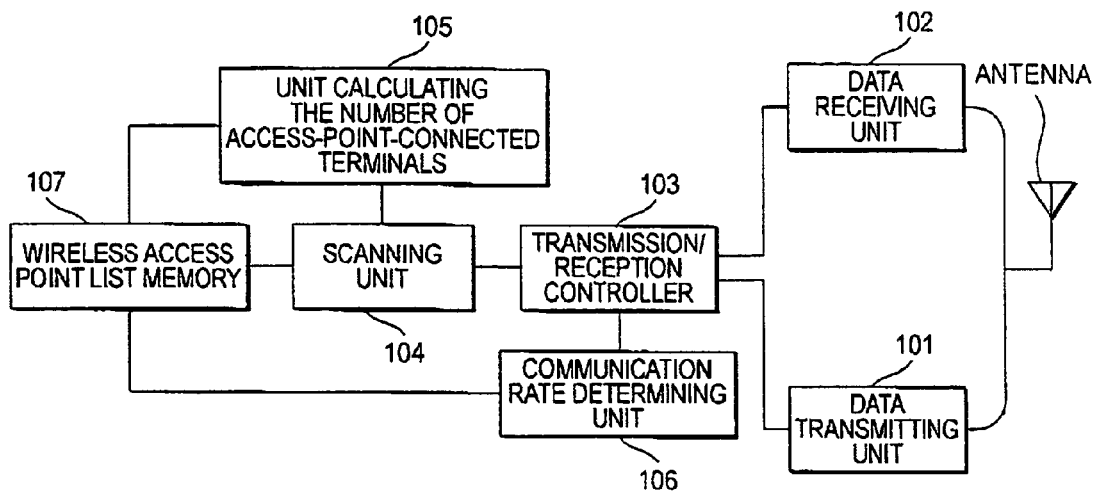
FIG. 13 is a block diagram illustrating a wireless access point selecting unit of a wireless apparatus in the present embodiment.
Figure 14:
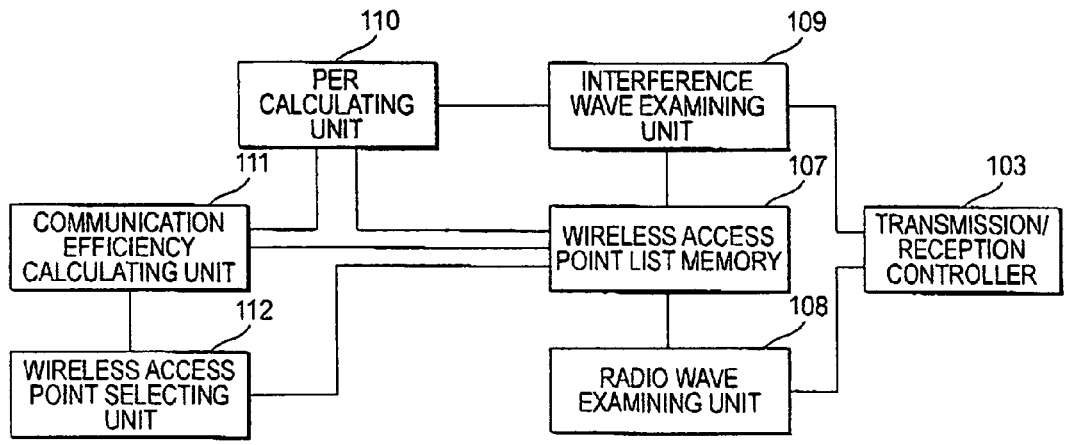
FIG. 14 is a block diagram illustrating the wireless access point selecting unit of the wireless apparatus in the present embodiment.

FIGS. 13 and 14 are block diagrams illustrating the configuration of a wireless access point selecting part (hereinafter, referred to as a 'wireless access point selecting unit') of a wireless apparatus according to the present embodiment, and the configuration is shown in two parts for the simplicity.

FIG. 13 is a block diagram illustrating a scanning portion mainly for creating a wireless access point list which becomes selected candidates. FIG. 14 is a block diagram illustrating a wireless access point selecting unit after the scanning process.

In FIG. 13, an antenna serves to transmit and received a radio wave. A data transmitting unit 101 converts predetermined data, which is to be transmitted, to radio signals, thereby performing a transmission process. A data receiving unit 102 receives radio signals when predetermined data is communicated by radio and then converts the signals to data signals.

A transmission/reception controller 103 performs control on transmission or reception of data, for example, retransmission control at the time of transmission.

A scanning unit 104 scans to find a wireless access point, which becomes a selected candidate, and detects a wireless access point having the same identifier. The scan is a process of detecting a communicable wireless access point, and the scanning process is performed for each channel used by a wireless LAN by receiving a beacon from a wireless access point or a probe response, which is a response to a probe request, received to the wireless access point. The detected wireless access point becomes a selected candidate. When the scanning process is performed by the scanning unit 104, MAC addresses of wireless access points which become selected candidates are stored in a wireless access point list memory 107, as shown in FIG. 15.

Figure 16:
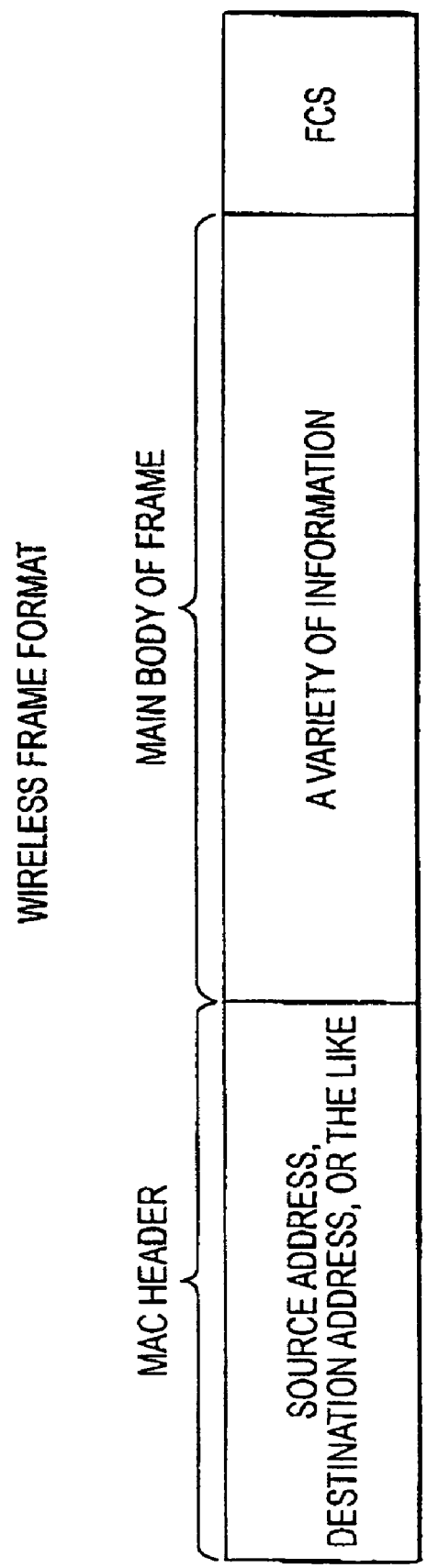
FIG. 16 is a view illustrating a wireless frame in IEEE 802.11.

In addition, it is determined whether the wireless access point has the same identifier or not on the basis of whether or not SSID included in the probe response or the beacon from the wireless access point is the same as SSID of the corresponding apparatus. FIG. 16 is a view illustrating an outline of a frame format of a wireless frame in IEEE 802.11. At the head of the frame, there exists an MAC header including an MAC address of a source or destination, then a main body of the frame indicating transmission data exists, and finally an FCS (frame check sequence) for checking an error exists. FIG. 7 shown earlier illustrates a part of a format of the beacon frame transmitted from a wireless access point. The SSID is included in a main frame body of the beacon frame, and it is possible to determine whether the wireless access point has the same identifier or not by comparing the SSID of the corresponding apparatus with the SSID of the beacon frame. In addition, since ESSID is included in the probe response, which is a response of a wireless access point with respect to a probe request, the probe response may be used.

If the number of access-point-connected terminals is included in the beacon or the probe response received from the wireless access point, a unit 105 calculating the number of access-point-connected terminals extracts the number of access-point-connected terminals and then stores the number of access-point-connected terminals in the wireless access point list memory 107, which is shown in FIG. 15. In this case, if a wireless access point does not correspond to the response of the number of access-point-connected terminals, the number of access-point-connected terminals may not be used to calculate the communication throughput by storing, for example, −1 in the wireless access point list memory 107.

A communication rate determining unit 106 determines a maximum speed (for example, 11 Mbps in the case of IEEE 802.11b) based on a communication method and then stores the speed in the wireless access point list memory 107, which is shown in FIG. 15.

Referring to FIG. 14, a radio wave examining unit 108 measures the received signal strength, which has been transmitted from selected-candidate wireless access points, stored in the wireless access point list memory 107 and then stores the measured strength in the wireless access point list memory 107, as is shown in FIG. 15. The received signal strength may be received signal strength at the time of receiving a beacon frame or a probe response to the probe request from the wireless access point, or received signal strength at the time of receiving a predetermined frame transmitted from a wireless access point. Moreover, in the present embodiment, it has been described that the scanning process and the process of measuring the strength of a signal received from the wireless access point are performed separately from each other; however, the received signal strength may be measured simultaneously when receiving the beacon or the probe response in the scanning process.

An interference wave examining unit 109 examines an interference wave with respect to each channel used by a wireless LAN and stores interference signal strength of each channel, which has been examined, in the wireless access point list memory 107, which is shown in FIG. 15.

Here, in the examination of the interference wave, a predetermined packet is received from a wireless access point or a wireless terminal for each channel at the time of the scanning process, and the received signal strength if the packet is measured. As a result, the received signal strength becomes interference signal strength. In addition, a channel corresponding to the interference signal is a channel currently being examined.

A PER calculating unit 110 calculates, for each selected-candidate wireless access point, an estimated PER value when communicating with a wireless access point on the basis of the interference adjacency, the interference signal strength, and the received signal strength, which have been transmitted from selected-candidate wireless access points, stored in the wireless access point list memory 107.

The PER calculating unit 110 uses equation or table obtained on the basis of a result of the experiments of calculating the PER described above, calculates the PER by using three parameters of received signal strength, interference signal strength, and interference adjacency, and stores the calculated PER in the wireless access point list memory 107, which is shown in FIG. 7.

For example, in the case in which the experimental results described earlier are used, when an interference signal having interference signal strength of 'a+k' exists in the interference adjacency 1 (adjacent channel), it is possible to obtain a graph of received signal strength (received power) where a PER increases versus PER, from received power of (X+50) dBm, by using equation 10. Consequently, if it is possible to know the received signal strength (received power) transmitted from a wireless access point, the PER can be calculated by using the obtained graph. The PER calculating unit 110 includes equation or table that performs a process of calculating the PER on the basis of the three parameters of the received signal strength, the interference signal strength, and the interference adjacency.

A communication efficiency calculating unit 111 calculates the throughput according to equation 2 or equation 3 on the basis of communication rate, the number of access-point-connected terminals, and the estimated PER value calculated for each wireless access point and stores the calculated throughput in the wireless access point list memory 107, as shown in table 1.

For example, in the case of PER=0.1, the number of access-point-connected terminals=2, and the communication rate=11 Mbps, an estimated communication throughput is calculated as follows.

Communication throughput=(1−0.1)×11/(2+1)=3.3 Mbps  (Equation 11)

Here, the calculated communication throughput corresponds to only a physical layer in radio, and a communication throughput in a transport layer, such as TCP, is much lower than that described above.

Finally, a wireless access point selecting unit 112 examines an estimated communication throughput of a selected-candidate wireless access point list. If a plurality of selected-candidate wireless access points exists, the wireless access point selecting unit 112 selects a highest communication throughput and then starts a connection process. In addition, if a plurality of wireless access points having a highest communication throughput exist, the wireless access point selecting unit 112 selects a wireless access point having highest received signal strength from the wireless access points.

Next, the corresponding relationship between the hardware configuration of the wireless apparatus 2 shown in FIG. 5 and the block configurations shown in FIGS. 13 and 14 will be described.

The data transmitting unit 101 and the data receiving unit 102 are implemented in the wireless module 43.

The transmission/reception controller 103 and the scanning unit 104 are implemented in the wireless MAC 31c.

The unit 105 calculating the number of access-point-connected terminals, the communication rate determining unit 106, the radio wave examining unit 108, the interference wave examining unit 109, the PER calculating unit 110, the communication efficiency calculating unit 111, and the wireless access point selecting unit 112 are implemented by causing the CPU 31a to read out a program stored in the flash ROM 33 and then to execute the program.

The wireless access point list memory is implemented in the SDRAM 32.

An operation of the wireless apparatus 2 shown in FIGS. 13 and 14 will now be described.

First, when the wireless apparatus 2 is powered on, the scanning unit scans all channels in order to detect a wireless access point which will be a selected candidate. The scanning method is to detect whether or not a selected-candidate wireless access point exists by receiving a beacon from a wireless access point or by receiving a probe response to a probe request from the wireless access point, as described above.

The scanning unit 104 obtains the detection result and then stores, in the wireless access point list memory 107, an MAC address of a wireless access point which becomes a selected candidate, which is shown in a second line (line indicating a selected candidate access point) of FIG. 15, for example.

Then, if the number of access-point-connected terminals is included in the beacon or the probe response, the unit 105 calculating the number of access-point-connected terminals stores the number of access-point-connected terminals, which is shown in a third line (line indicating the number of access-point-connected terminals) of FIG. 15, in the wireless access point list memory 107.

Thereafter, the communication rate determining unit 106 determines a maximum communication rate, which is determined on the basis of a communication method, in the wireless access point list memory 107, which is shown in a fourth line (line indicating a communication rate) of FIG. 15.

Then, if the radio wave examining unit 108 examines the received signal strength of the wireless access point on the basis of the beacon or the probe response received from the wireless access point and then stores the received signal strength in the wireless access point list memory 107, which is shown in a fifth line (line indicating received signal strength) of FIG. 15.

Then, the interference wave examining unit 109 examines an interference wave with respect to the entire channels and stores the interference signal strength in the wireless access point list memory 107, which is shown in a sixth line (line indicating interference signal strength) of FIG. 15.

The interference adjacency is not stored in the wireless access point list memory 107 because the interference adjacency can be calculated if it is possible to know how many channels a channel used by a wireless access point and a channel corresponding to an interference wave are apart from each other.

Subsequently, the PER calculating unit 110 calculates an estimated PER value of each selected-candidate wireless access point on the basis of the interference adjacency obtained in the calculation process and the interference signal strength and the received signal strength stored in the wireless access point list memory 107, and then stores the calculated PER values in the wireless access point list memory 107, which is shown in a seventh line (line indicating PER estimation) of FIG. 15. For example, in the case of AP1 using CH1 of FIG. 15, the AP1 is largely affected by interference of CH2, and the received signal strength is A1, the interference signal strength is B1, and the interference adjacency is 1. The PER calculating unit 110 calculates a PER on the basis of these values.

Subsequently, the communication efficiency calculating unit 111 calculates, according to equation 2 or equation 3, an estimated communication throughput value when communicating with a wireless access point on the basis of the PER, the number of access-point-connected terminals, and the communication rate stored in the wireless access point list memory 107 and then stores the calculated value in the wireless access point list memory 107, which is shown in an eighth line (line indicating throughput estimation) of FIG. 15.

Finally, the wireless access point selecting unit 112 selects a wireless access point having a highest communication throughput from the estimated throughput values stored in the wireless access point list memory 107 and then performs the connection process. In this case, if a plurality of wireless access points having a highest communication throughput exist, the wireless access point selecting unit 112 selects a wireless access point having highest received signal strength from the wireless access points.

Hereinbefore, it has been described about the operation of selecting a wireless access point estimated to have the highest communication efficiency, which is performed by the wireless apparatus 2 according to the present embodiment.

Next, it will be described how the wireless apparatus 2 according to the present embodiment operates in an aspect such as the wireless access point selecting unit (refer to FIGS. 13 and 14).

Figure 17:
FIG. 17 is a block diagram illustrating a device that starts up a wireless access point selecting unit in the present embodiment.

FIG. 17 is a block diagram illustrating a device that starts up a wireless access point selecting unit in the present embodiment. In the above description, the case of causing the wireless access point selecting unit 120 to operate when the wireless apparatus 2 is powered on has been exemplified. FIG. 17 illustrates the configuration for starting up the wireless access point selecting unit 120 when the wireless apparatus 2 is powered on. In addition, a unit 121 starting up a wireless access point selecting unit is implemented by causing the CPU 31a to read out a program stored in the flash ROM 33 and then to execute the program. In addition, the wireless access point selecting unit 120 may also operate at several timings.

Figure 18:
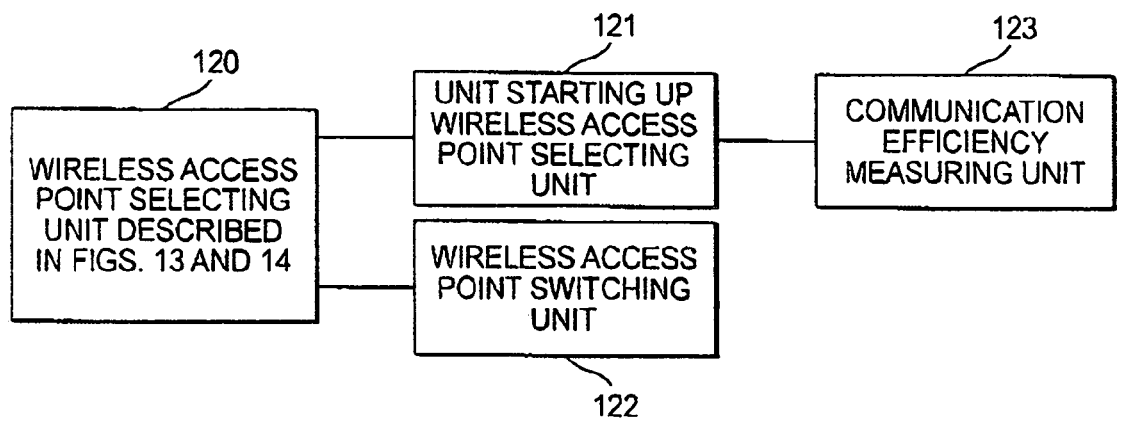
FIG. 18 is a block diagram illustrating a device that selects a wireless access point on the basis of communication efficiency in the present embodiment.

In a first case, while the wireless apparatus 2 is communicating with a predetermined wireless access point connected therewith, it is possible to cause the wireless access point selecting unit 120 to operate when a packet error begins to occur frequently and the communication efficiency lowers. In this case, a block diagram illustrating a device that selects a wireless access point on the basis of the communication efficiency in the present embodiment is shown in FIG. 18. In addition, a wireless access point switching unit 122 and a communication efficiency measuring unit 123 are implemented by causing the CPU 31a to read out a program stored in the flash ROM 33 and then to execute the program.

For example, under a state in which actual communication efficiency is measured by the communication efficiency measuring unit 123 and a predetermined threshold value with respect to the communication throughput is set, when a value of the communication throughput at the time of actual communication becomes less than the threshold value, it is possible to cause the wireless access point selecting unit 120 according to the present embodiment to operate. Or, even when the PER is close 0% at the communication throughput having a value equal to or larger than a predetermined threshold value, if it is expected that the PER will abruptly increase and the communication throughput will be greatly reduced on the basis of relationship indicated by the curve of received signal strength (received power) versus PER if the received signal strength becomes lower than now, it may be possible to cause the wireless access point selecting unit 120 according to the present embodiment to operate beforehand.

Figure 19:
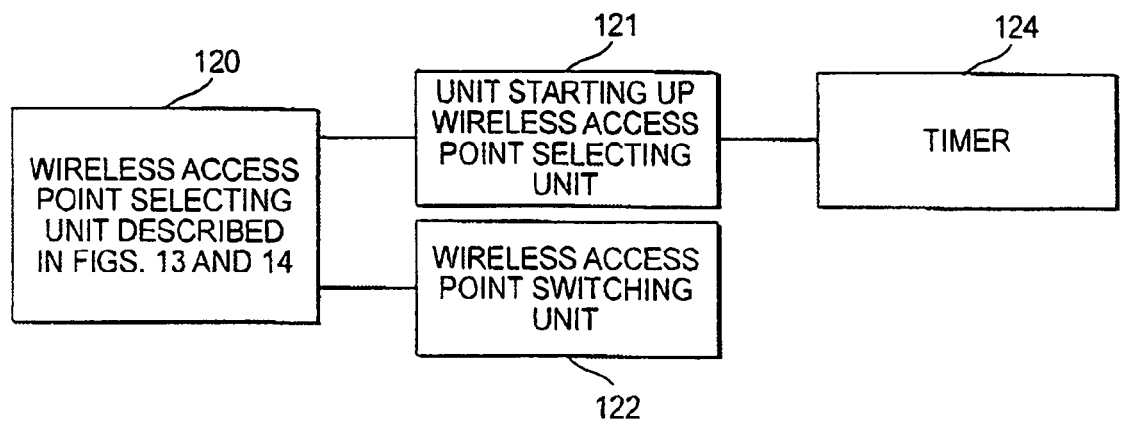
FIG. 19 is a block diagram illustrating a device that periodically selects a wireless access point in the present embodiment.

In a second case, while the wireless apparatus 2 is communicating with a predetermined wireless access point connected therewith, the communication throughput of a selected-candidate wireless access point is periodically calculated every predetermined period by using a timer 124 or the like, and then if it is determined that another wireless access point other than the currently communicating wireless access point has a sufficiently high communication throughput, an operation of switching the currently communicating wireless access point to the wireless access point having the sufficiently high communication throughput may be performed. In this case, a block diagram illustrating a device that periodically selects a wireless access point is shown in FIG. 19. In addition, the timer 124 is implemented by causing the CPU 31a to read out a program stored in the flash ROM 33 and then to execute the program.

Figure 20:
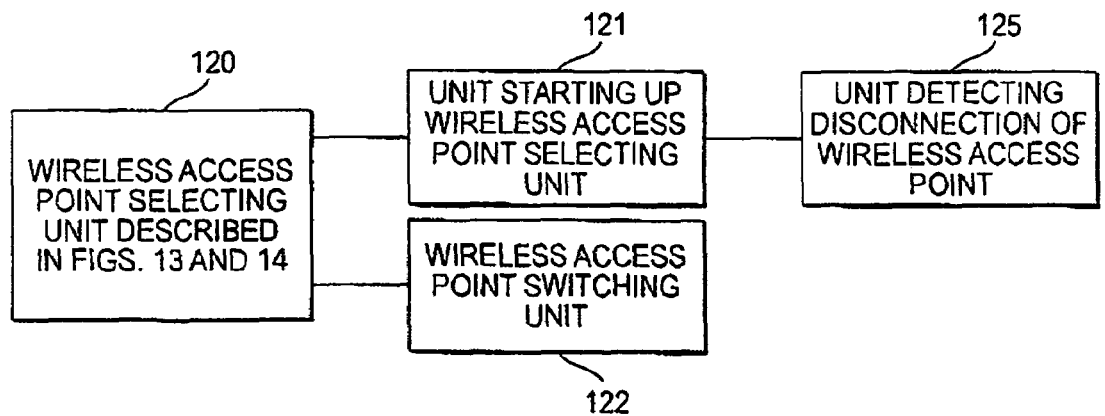
FIG. 20 is a block diagram illustrating a device that switches a wireless access point due to disconnection of communication in the present embodiment.

In a third case, when the wireless apparatus 2 moves and thus the wireless apparatus 2 is disconnected from the currently communicating wireless access point, it is possible to cause the wireless access point selecting unit 20 to operation in order to find a wireless access point connected with the wireless apparatus 2. A block diagram of a device that switches a wireless access point due to the disconnection of communication is shown in FIG. 20. In addition, a unit 125 detecting disconnection of a wireless access point is implemented by causing the CPU 31a to read out a program stored in the flash ROM 33 and then to execute the program.

Figure 21:
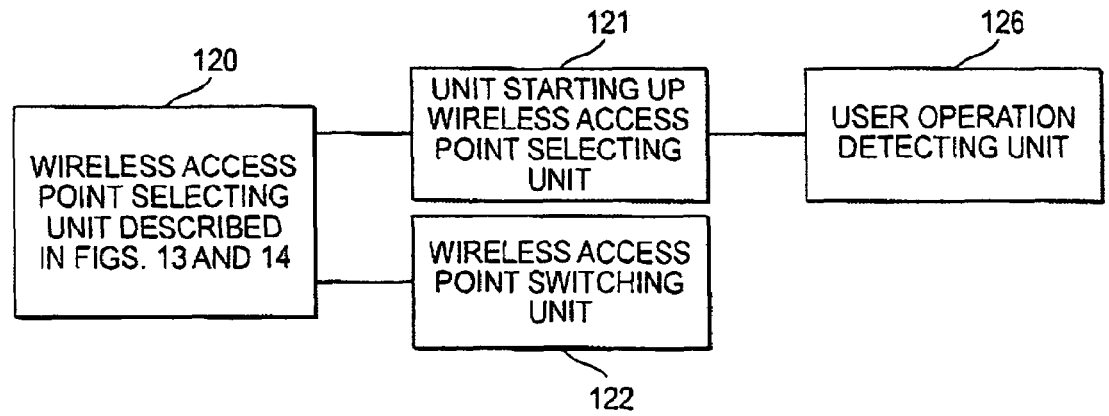
FIG. 21 is a block diagram illustrating a device that allows a user to switch a wireless access point in the present embodiment.

In a fourth case, under a state while a user is using the wireless apparatus 2, if it is detected that a communication state deteriorates, for example, a voice pauses at predetermined distances in the case when the wireless apparatus 2 is a telephone device, a user may cause the wireless access point selecting unit 120 to start. A block diagram of a device that allows a user to switch a wireless access point is shown in FIG. 21. In addition, a user operation detecting unit 126 is implemented by causing the CPU 31a to read out a program stored in the flash ROM 33 and then to execute the program.

As described above, it is possible to cause the wireless access point selecting unit to operate in any cases, such as a case in which another wireless access point needs to be selected in order to increase the communication efficiency, as well as the time when the wireless apparatus 2 is connected with a wireless access point at the beginning stage.

Next, as an example of a method of selecting a wireless access point in the present embodiment, a process of switching a currently communicating wireless access point to another wireless access point because the communication efficiency has lowered during the communication will be described with reference to an operation flow chart shown in FIG. 22.

In addition, the configuration implemented by the CPU 31a shown in FIG. 5 can also be realized by a process using a program of a general-purpose computer.

Figure 22:
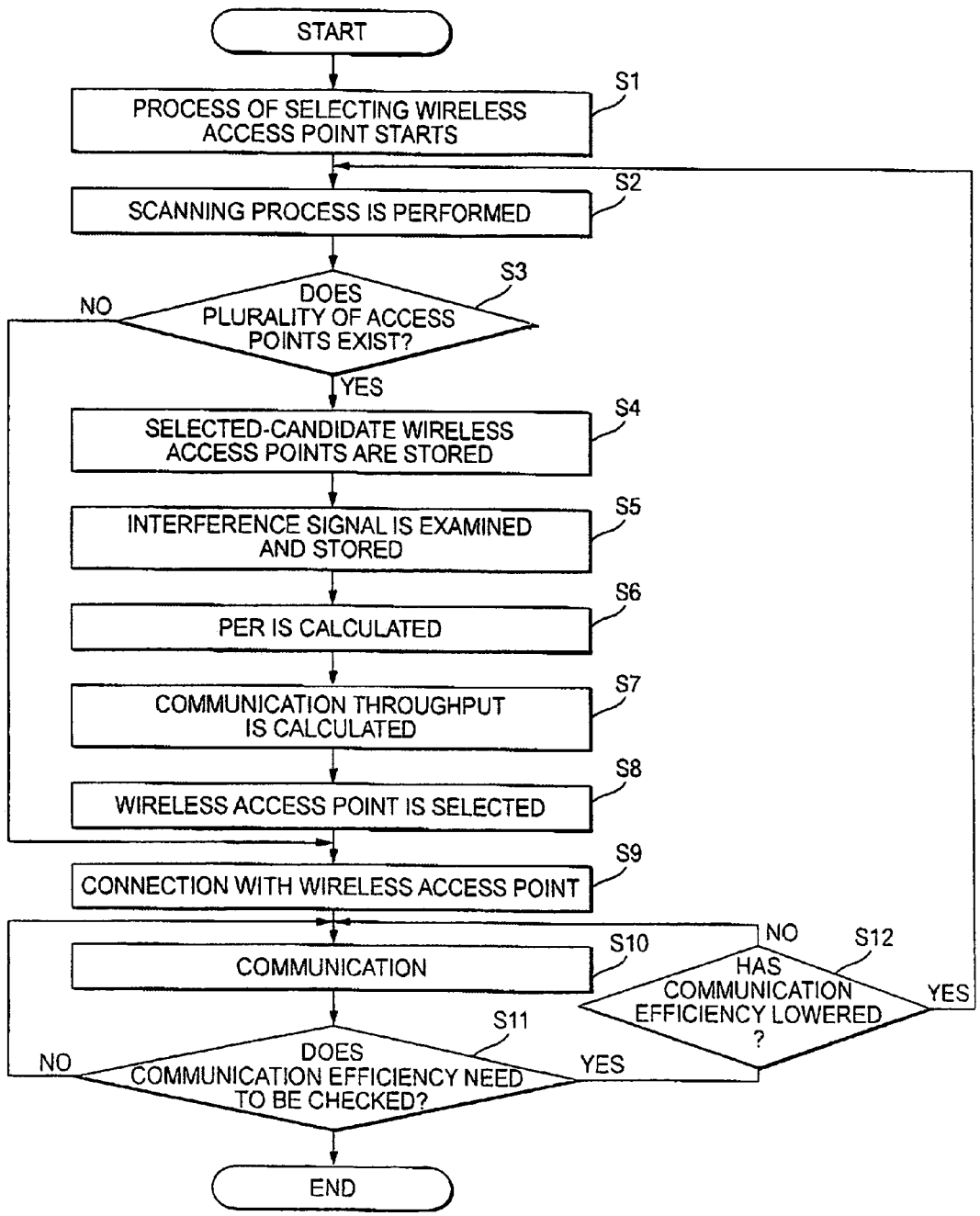
FIG. 22 is a flow chart illustrating an operation of selecting a wireless access point in the present embodiment.

Referring to FIG. 22, first, a process of selecting a wireless access point starts in step S1. In step S2, in order to start the communication, a scanning process of finding a connected wireless access point is performed.

In step S3, it is checked whether or not a plurality of selected-candidate wireless access points exist on the basis of a result of the scanning process in step S2, and if only wireless access point is detected, the process proceeds to step S9.

In step S3, if the plurality of selected-candidate wireless access points is detected, the process proceeds to step S4, and information, such as a communication rate, the number of access-point-connected terminals, and the received signal strength of each of the plurality of selected-candidate wireless access points, is stored.

Then, in step S5, interference waves around the selected-candidate wireless access points are examined an then the interference signal strength is stored. In step S6, a PER corresponding to each of the selected-candidate wireless access points is calculated on the basis of the received signal strength, the interference signal strength, and the interference adjacency which have been examined. In step S7, a communication throughput of each wireless access point is calculated. In step S8, one of the selected-candidate wireless access points, which is expected to have a highest communication throughput, is selected. Here, in step S8, if a plurality of wireless access points having a highest communication throughput exist, a wireless access point having highest received signal strength is selected from the plurality of wireless access points.

In step S9, connection with a selected wireless access point is performed. If the connection is made, a variety of communication is performed through the selected wireless access point in step S10.

In step S11, it is checked whether or not communication efficiency is to be checked. If the communication efficiency is to be checked, it is checked whether or not a packet error occurs frequently in step S12. As a result of the check, for example, if the communication throughput has lowered due to an increased PER, the process returns to step S2 in which a scanning process is performed again, thereby performing a process of selecting a wireless access point. If the communication efficiency has not lowered, the process returns to step S10 in which the communication is continued.

As described above, according to the present embodiment, a PER when a wireless apparatus is connected with a predetermined wireless access point is estimated on the basis of three parameters of the received signal strength, the interference signal strength, and the interference adjacency, which have been transmitted from the wireless access point, then the communication throughput is calculated by using the estimated PER, and the connection with a wireless access point expected to have highest communication efficiency is performed. As a result, it is possible to select a wireless access point having high communication efficiency with good precision, as compared with a method, in the related art, of simply performing a connection with a wireless access point having high received signal strength or a method of simply performing a connection with a wireless access point where an interference wave is strong.

This application is based upon and claims the benefit of priority of Japanese Patent Application No. 2005-298535 filed on Oct. 13, 2005, the contents of which are incorporated herein by reference in its entirety.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

[Name of Document] DRAWINGS

[FIG. 3]
51: MAIN IC
53: RESET IC
59: WIRELESS LAN CONTROLLER
60: WIRELESS MODULE
60d: RF MODEM
58: DC-DC CONVERTER
13: DC POWER CONNECTOR

[FIG. 5]
35: BATTERY
36: DC-DC CONVERTER
37: VOLTAGE RAISING CIRCUIT FOR LCD POWER
38: RESET IC
31: BASEBAND IC
31d: WIRELESS MAC
43: WIRELESS MODULE
43d: RF MODEM
23: KEY MATRIX

[FIG. 6]
OUTPUT POWER
FREQUENCY

[FIG. 7]
MAC HEADER
MAIN BODY OF FRAME
SOURCE ADDRESS, DESTINATION ADDRESS, OR THE LIKE
TIME STAMP
BEACON DISTANCE OR THE LIKE
PARAMETER SET OR THE LIKE
INFORMATION ELEMENT

[FIG. 8]
INFORMATION ELEMENT OF IEEE 802.11
INFORMATION ELEMENT
ELEMENT ID
FH Parameter Set OR THE LIKE

[FIG. 9]
RECEIVED POWER–PER
EXPERIMENTAL RESULT
APPROXIMATE CURVE
RECEIVED POWER (dBm)

[FIG. 10]
RECEIVED POWER VERSUS PER IN THE CASE OF ADJACENT CHANNEL INTERFERENCE
RECEIVED POWER–PER
ADJACENT INTERFERENCE STRENGTH (a−2×k) dB
ADJACENT INTERFERENCE STRENGTH (a−k) dB
ADJACENT INTERFERENCE STRENGTH a dB
NO INTERFERENCE
APPROXIMATE CURVE OBTAINED BY PARALLEL MOVE
RECEIVED POWER (dBm)

[FIG. 11]
RECEIVED POWER VERSUS PER IN THE CASE OF TWO ADJACENT CHANNEL INTERFERENCE
RECEIVED POWER–PER
TWO ADJACENT INTERFERENCE STRENGTH a dB
TWO ADJACENT INTERFERENCE STRENGTH a−k dB
NO INTERFERENCE
RECEIVED POWER (dBm)

[FIG. 12]
RECEIVED POWER VERSUS PER IN THE CASE WHEN INTERFERENCE CORRESPONDING TO SEVERAL INTERFERENCE ADJACENCIES EXISTS
RECEIVED POWER–PER
FOUR ADJACENT INTERFERENCE STRENGTH a dB
THREE ADJACENT INTERFERENCE STRENGTH a dB
TWO ADJACENT INTERFERENCE STRENGTH a dB
ADJACENT INTERFERENCE STRENGTH a dB
NO INTERFERENCE
RECEIVED POWER (dBm)

[FIG. 13]
ANTENNA
102: DATA RECEIVING UNIT
105: UNIT CALCULATING THE NUMBER OF ACCESS-POINT-CONNECTED TERMINALS
107: WIRELESS ACCESS POINT LIST MEMORY
104: SCANNING UNIT
103: TRANSMISSION/RECEPTION CONTROLLER
106: COMMUNICATION RATE DETERMINING UNIT
101: DATA TRANSMITTING UNIT

[FIG. 14]
109: INTERFERENCE WAVE EXAMINING UNIT
110: PER CALCULATING UNIT
111: COMMUNICATION EFFICIENCY CALCULATING UNIT
107: WIRELESS ACCESS POINT LIST MEMORY
103: TRANSMISSION/RECEPTION CONTROLLER
112: WIRELESS ACCESS POINT SELECTING UNIT
108: RADIO WAVE EXAMINING UNIT

[FIG. 15]
EXAMPLE OF A VARIETY OF INFORMATION STORED IN WIRELESS ACCESS POINT LIST MEMORY
CHANNEL
SELECTED-CANDIDATE ACCESS POINT
AP1 MAC ADDRESS
AP2 MAC ADDRESS
AP3 MAC ADDRESS
THE NUMBER OF ACCESS-POINT-CONNECTED TERMINALS
COMMUNICATION RATE
RECEIVED SIGNAL STRENGTH
INTERFERENCE SIGNAL STRENGTH
PER ESTIMATION
THROUGHPUT ESTIMATION

[FIG. 16]
WIRELESS FRAME FORMAT
MAC HEADER
MAIN BODY OF FRAME
SOURCE ADDRESS, DESTINATION ADDRESS, OR THE LIKE
A VARIETY OF INFORMATION

[FIG. 17]
120: WIRELESS ACCESS POINT SELECTING UNIT DESCRIBED IN FIGS. 13 AND 14
121: UNIT STARTING UP WIRELESS ACCESS POINT SELECTING UNIT

[FIG. 18]
120: WIRELESS ACCESS POINT SELECTING UNIT DESCRIBED IN FIGS. 13 AND 14
121: UNIT STARTING UP WIRELESS ACCESS POINT SELECTING UNIT
122: WIRELESS ACCESS POINT SWITCHING UNIT
123: COMMUNICATION EFFICIENCY MEASURING UNIT

[FIG. 19]
120: WIRELESS ACCESS POINT SELECTING UNIT DESCRIBED IN FIGS. 13 AND 14
121: UNIT STARTING UP WIRELESS ACCESS POINT SELECTING UNIT
122: WIRELESS ACCESS POINT SWITCHING UNIT
124: TIMER

[FIG. 20]
120: WIRELESS ACCESS POINT SELECTING UNIT DESCRIBED IN FIGS. 13 AND 14
121: UNIT STARTING UP WIRELESS ACCESS POINT SELECTING UNIT
122: WIRELESS ACCESS POINT SWITCHING UNIT
125: UNIT DETECTING DISCONNECTION OF WIRELESS ACCESS POINT

[FIG. 21]
120: WIRELESS ACCESS POINT SELECTING UNIT DESCRIBED IN FIGS. 13 AND 14
121: UNIT STARTING UP WIRELESS ACCESS POINT SELECTING UNIT
122: WIRELESS ACCESS POINT SWITCHING UNIT
126: USER OPERATION DETECTING UNIT

[FIG. 22]
START
S1: PROCESS OF SELECTING WIRELESS ACCESS POINT STARTS
S2: SCANNING PROCESS IS PERFORMED
S3: DOES A PLURALITY OF ACCESS POINTS EXIST?
S4: SELECTED-CANDIDATE WIRELESS ACCESS POINTS ARE STORED
S5: INTERFERENCE SIGNAL IS EXAMINED AND STORED
S6: PER IS CALCULATED
S7: COMMUNICATION THROUGHPUT IS CALCULATED
S8: WIRELESS ACCESS POINT IS SELECTED
S9: CONNECTION WITH WIRELESS ACCESS POINT
S10: COMMUNICATION
S11: DOES COMMUNICATION EFFICIENCY NEED TO BE CHECKED?
S12: HAS COMMUNICATION EFFICIENCY LOWERED?
END

What is claimed is:

1. A wireless apparatus that selects one of a plurality of wireless access points so as to perform wireless communication therewith, the wireless apparatus comprising:
   a scanning unit that scans accessible wireless access points;
   a calculating unit that calculates an estimated communication efficiency value of each wireless access point on the basis of received signal strength, interference signal strength, and interference adjacency of each of the scanned wireless access points;
   a selecting unit that selects one of the scanned wireless access points on the basis of the estimated communication efficiency values calculated by the calculating unit; and
   a memory that stores approximate relation data indicating a relationship between the received signal strength and a packet error rate, wherein:
   the calculating unit calculates an estimated packet error rate of each wireless access point on the basis of the received signal strength, the interference signal strength, and the interference adjacency, thereby obtaining the estimated communication efficiency value, and
   the calculating unit corrects the approximate relation data stored in the memory on the basis of the interference signal strength and the interference adjacency and then calculates the estimated packet error rate on the basis of the received signal strength by using the corrected approximate relation data.

2. The wireless apparatus according to claim 1, wherein the calculating unit calculates an estimated communication throughput corresponding to each access point by using a transmission rate of each access point, thereby obtaining the estimated communication efficiency value.

3. The wireless apparatus according to claim 2, wherein the calculating unit calculates the estimated packet error rate and then calculates the estimated communication throughput corresponding to each access point by using the transmission rate and the number of terminals connected with each wireless access point.

4. The wireless apparatus according to claim 1, wherein the selecting unit selects a wireless access point corresponding to the highest received signal strength if the estimated communication efficiency values are the same.

5. The wireless apparatus according to claim 1, wherein, when the wireless apparatus starts, the scanning unit scans the accessible wireless access points.

6. The wireless apparatus according to claim 1, further comprising:
   a measuring unit that, while the wireless apparatus is wirelessly communicating with a wireless access point, periodically measures a communication efficiency value between the wireless apparatus and the wireless access point,
   wherein, when the communication efficiency value measured by the measuring unit becomes less than a threshold value, the scanning unit scans the accessible wireless access points.

7. The wireless apparatus according to claim 1, wherein, while the wireless apparatus is wirelessly communicating with a wireless access point, the scanning unit periodically scans the accessible wireless access points when a communication efficiency value measured by a measuring unit becomes less than a threshold value.

8. The wireless apparatus according to claim 1, further comprising:

a detecting unit that detects disconnection of communication with a wireless access point that performs the wireless communication, wherein, when the detecting unit has detected the disconnection, the scanning unit scans the accessible wireless access points.

9. The wireless apparatus according to claim 1, further comprising:

an instruction detecting unit that detects an operation instruction from a user, wherein, when the instruction detecting unit has detected the operation instruction from the user, the scanning unit scans the accessible wireless access points.

10. A wireless access point selection method of selecting one of a plurality of wireless access points in a wireless communication, the method comprising:

scanning accessible wireless access points;

calculating an estimated communication efficiency value of each wireless access point on the basis of received signal strength, interference signal strength, and interference adjacency of each of the scanned wireless access points; and selecting one of the scanned wireless access points on the basis of the estimated communication efficiency values that have been calculated wherein:

an estimated packet error rate of each wireless access point is calculated on the basis of the received signal strength, the interference signal strength, and the interference adjacency, thereby obtaining the estimated communication efficiency value, and approximate relation data indicating a relationship between the received signal strength and a packet error rate is stored in a memory, the approximate relation data stored in the memory is corrected on the basis of the interference signal strength and the interference adjacency, and the estimated packet error rate is calculated on the basis of the received signal strength by using the corrected approximate relation data.

11. The wireless access point selection method according to claim 10, wherein the estimated packet error rate of each wireless access point is calculated on the basis of the received signal strength, the interference signal strength, and the interference adjacency and an estimated communication throughput corresponding to each access point is calculated by using a transmission rate of each access point, thereby obtaining the estimated communication efficiency value.

* * * * *